US008782586B2

(12) United States Patent
Sezginer et al.

(10) Patent No.: US 8,782,586 B2
(45) Date of Patent: Jul. 15, 2014

(54) METHOD, SYSTEM, AND PROGRAM PRODUCT FOR ROUTING AN INTEGRATED CIRCUIT TO BE MANUFACTURED BY DOUBLED PATTERNING

(75) Inventors: Abdurrahman Sezginer, Monte Sereno, CA (US); David Cooke Noice, Palo Alto, CA (US); Jason Sweis, San Jose, CA (US); Vassilios Gerousis, San Jose, CA (US); Sozen Yao, Cupertino, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 491 days.

(21) Appl. No.: 12/582,366

(22) Filed: Oct. 20, 2009

(65) Prior Publication Data

US 2011/0014786 A1 Jan. 20, 2011

Related U.S. Application Data

(60) Provisional application No. 61/226,261, filed on Jul. 16, 2009.

(51) Int. Cl.
*G06F 17/50* (2006.01)
(52) U.S. Cl.
USPC ............... 716/126; 716/54; 716/55; 716/129; 716/130
(58) Field of Classification Search
USPC ................ 716/54, 55, 126, 129, 130
See application file for complete search history.

(56) References Cited

U.S. PATENT DOCUMENTS

| 4,890,238 A | 12/1989 | Klein et al. |
| 7,913,197 B1 | 3/2011 | Kruger et al. |
| 2007/0044061 A1* | 2/2007 | Nakamoto ............... 716/13 |
| 2008/0005713 A1 | 1/2008 | Singh et al. |
| 2008/0077900 A1 | 3/2008 | Oh et al. |
| 2008/0307381 A1 | 12/2008 | Tritchkov et al. |
| 2009/0106727 A1* | 4/2009 | McCullen ............... 716/12 |
| 2010/0199253 A1* | 8/2010 | Cheng et al. ............ 716/13 |
| 2011/0014786 A1* | 1/2011 | Sezginer et al. ........ 438/618 |
| 2011/0113393 A1 | 5/2011 | Sezginer |

OTHER PUBLICATIONS

Wiaux, V., "Split and Design Guidelines for Double Patterning," Proceedings of SPIE vol. 6924, p. 692409-1, SPIE, Bellingham, WA, 2008.
Maenhoudt, M., et al., "Alternative process schemes for double patterning that eliminate the intermediate etch step," Proceedings of SPIE vol. 6924 69240P-1, SPIE, Bellingham, WA, 2008.
Bencher, C., "SADP: The Best Option for <32nm NAND Flash," Nanochip Technology Journal, Issue 2, 2007.
Ghan, J, et al, for U.S. Appl. No. 12/189,692, filed Aug. 11, 2008.
Weling et al., for U.S. Appl. No. 12/264,853, filed Nov. 4, 2008.

(Continued)

*Primary Examiner* — Vuthe Siek
(74) *Attorney, Agent, or Firm* — Vista IP Law Group, LLP

(57) ABSTRACT

Disclosed are a method, apparatus, and program product for routing an electronic design using double patterning that is correct by construction. The layout that has been routed will by construction be designed to allow successful manufacturing with double patterning, since the router will not allow a routing configuration in the layout that cannot be successfully manufactured with double patterning.

24 Claims, 25 Drawing Sheets

(56) References Cited

OTHER PUBLICATIONS

Weling et al., for U.S. Appl. No. 12/264,139, filed Nov. 3, 2008.
Huckabay et al., for U.S. Appl. No. 12/272,550, filed Nov. 17, 2008.
Final Office Actioin dated Feb. 15, 2012 for U.S. Appl. No. 12/614,911.
Final Office Action dated Mar. 26, 2012 for U.S. Appl. No. 12/719,710.
Conley et al. "From Simulation to Characterization—Integrated Approach for Self Aligned Double Patterning Defectivity," Semiconductor Manufacturing (ISSM), 2008 International Symposium on. 2008. pp. 11-14.
Non-Final Office Action dated Sep. 23, 2011 for U.S. Appl. No. 12/614,911.
Fonseca, C. et al., "Advances and challenges in dual-tone development process optimization," Proc. SPIE 7274, 72740I, Feb. 24, 2009.
Non-Final Office Action dated Nov. 9, 2011 for U.S. Appl. No. 12/719,710.
Non-Final Office Action dated Jun. 26, 2012 for U.S. Appl. No. 12/614,911.
Final Office Action dated Nov. 2, 2012 for U.S. Appl. No. 12/614,911.
Notice of Allowance dated May 16, 2013 for U.S. Appl. No. 12/614,911.

* cited by examiner

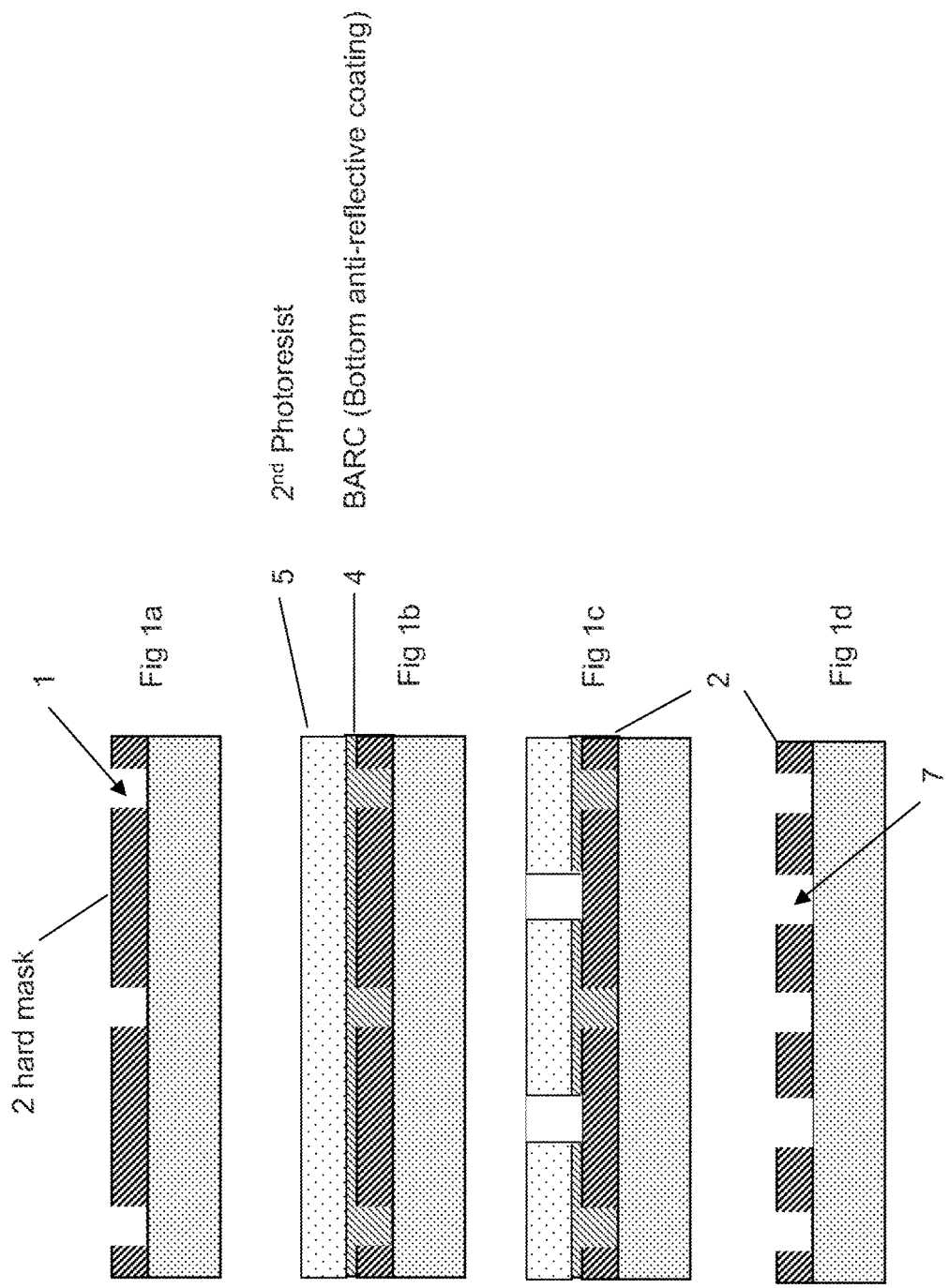

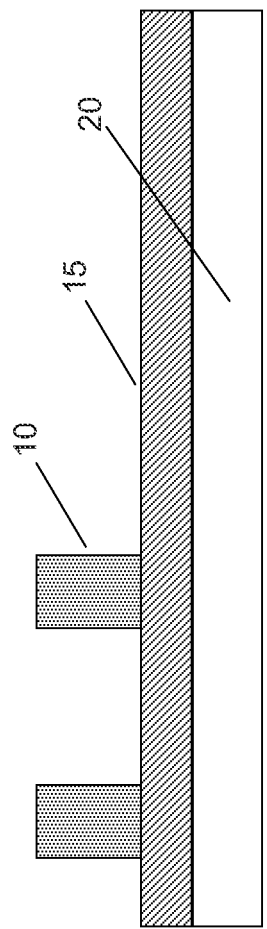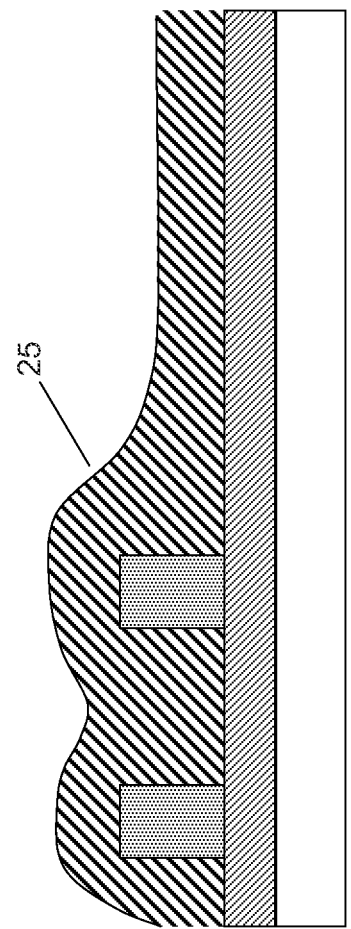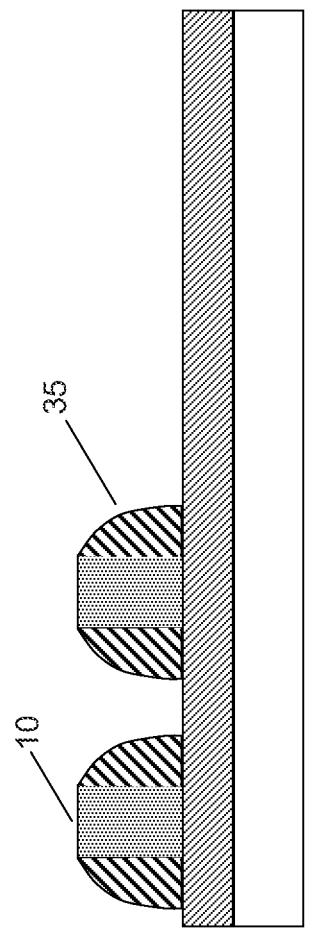

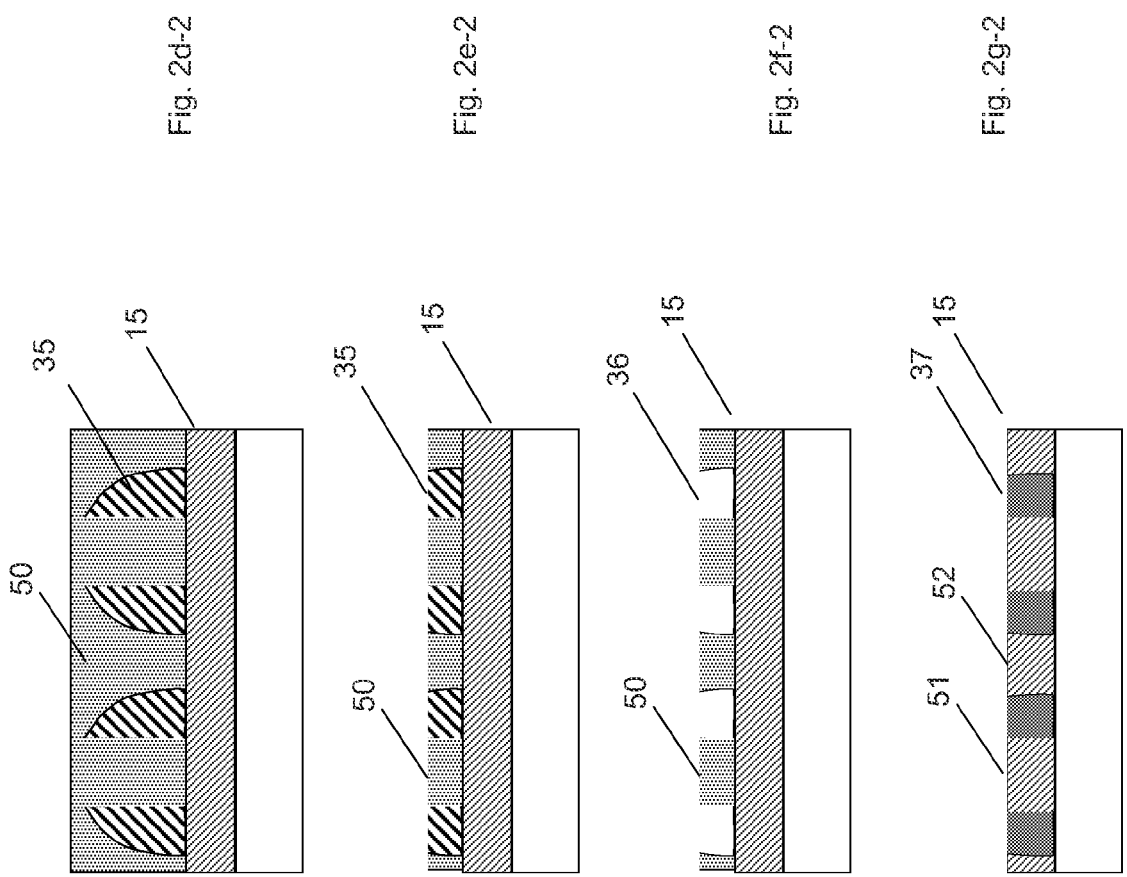

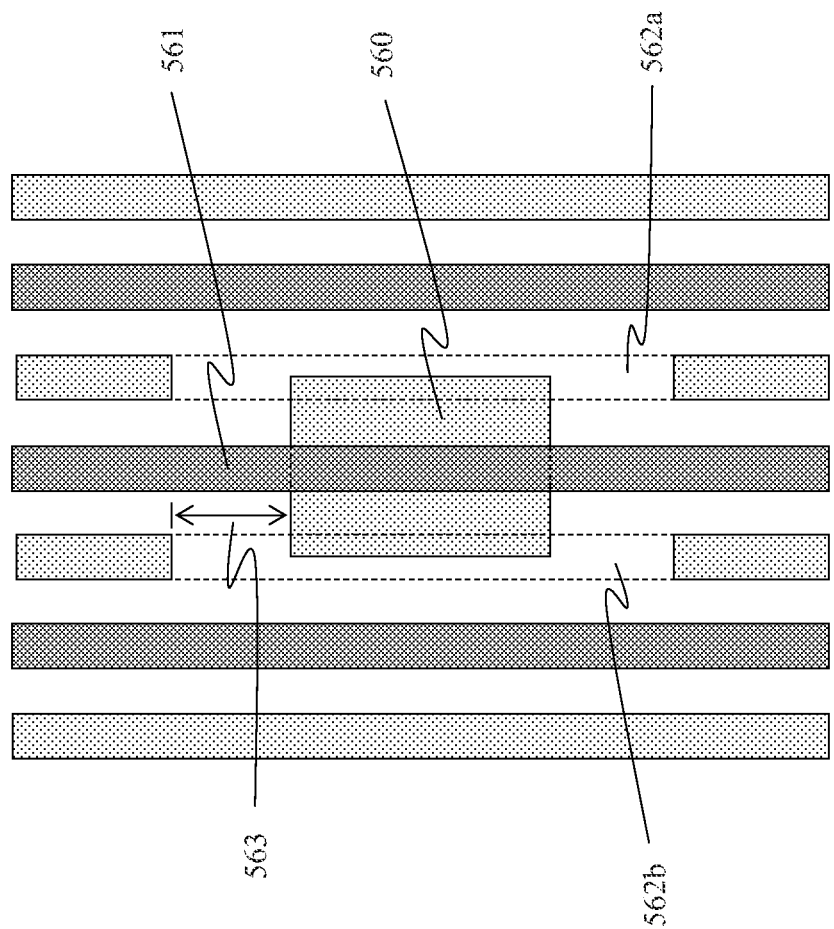

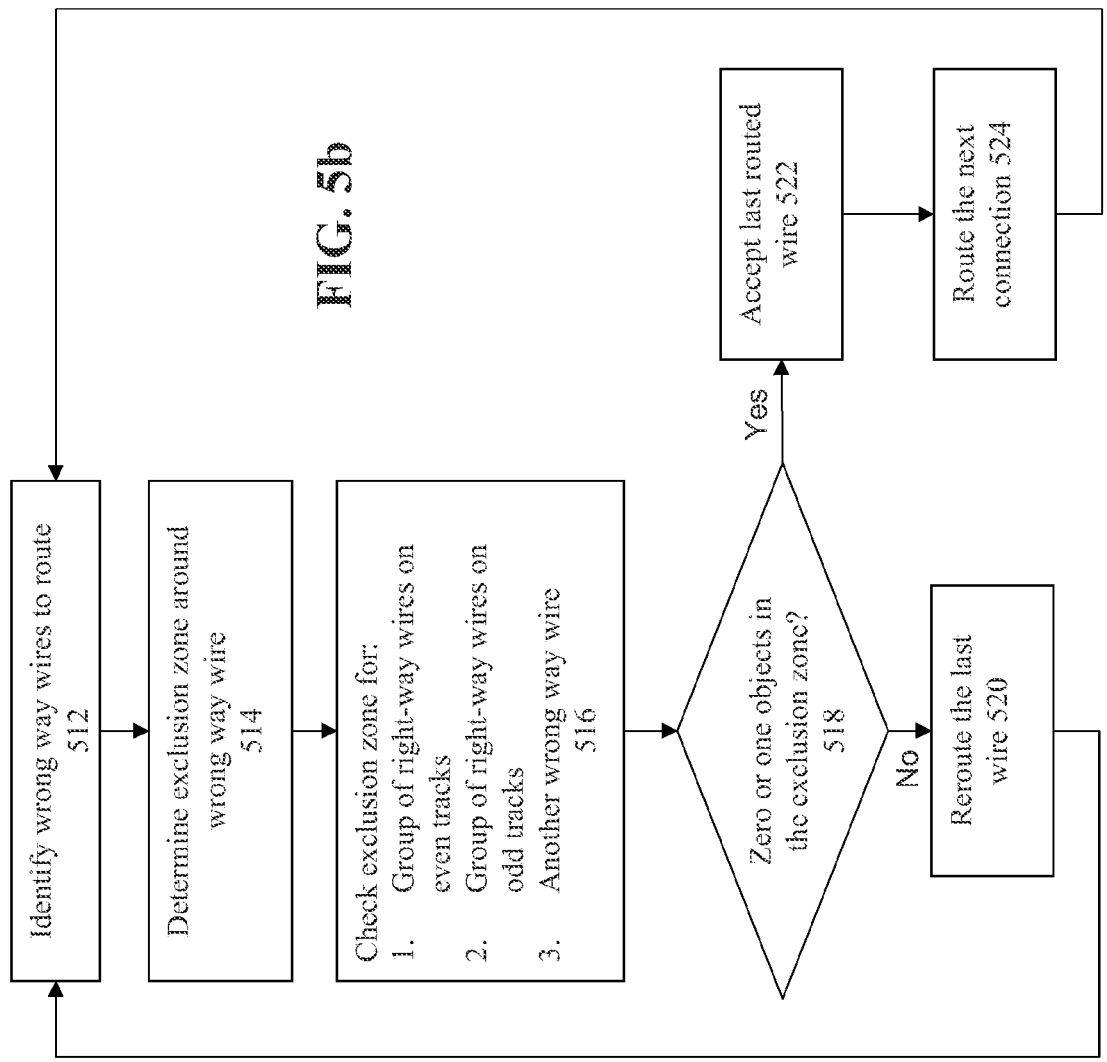

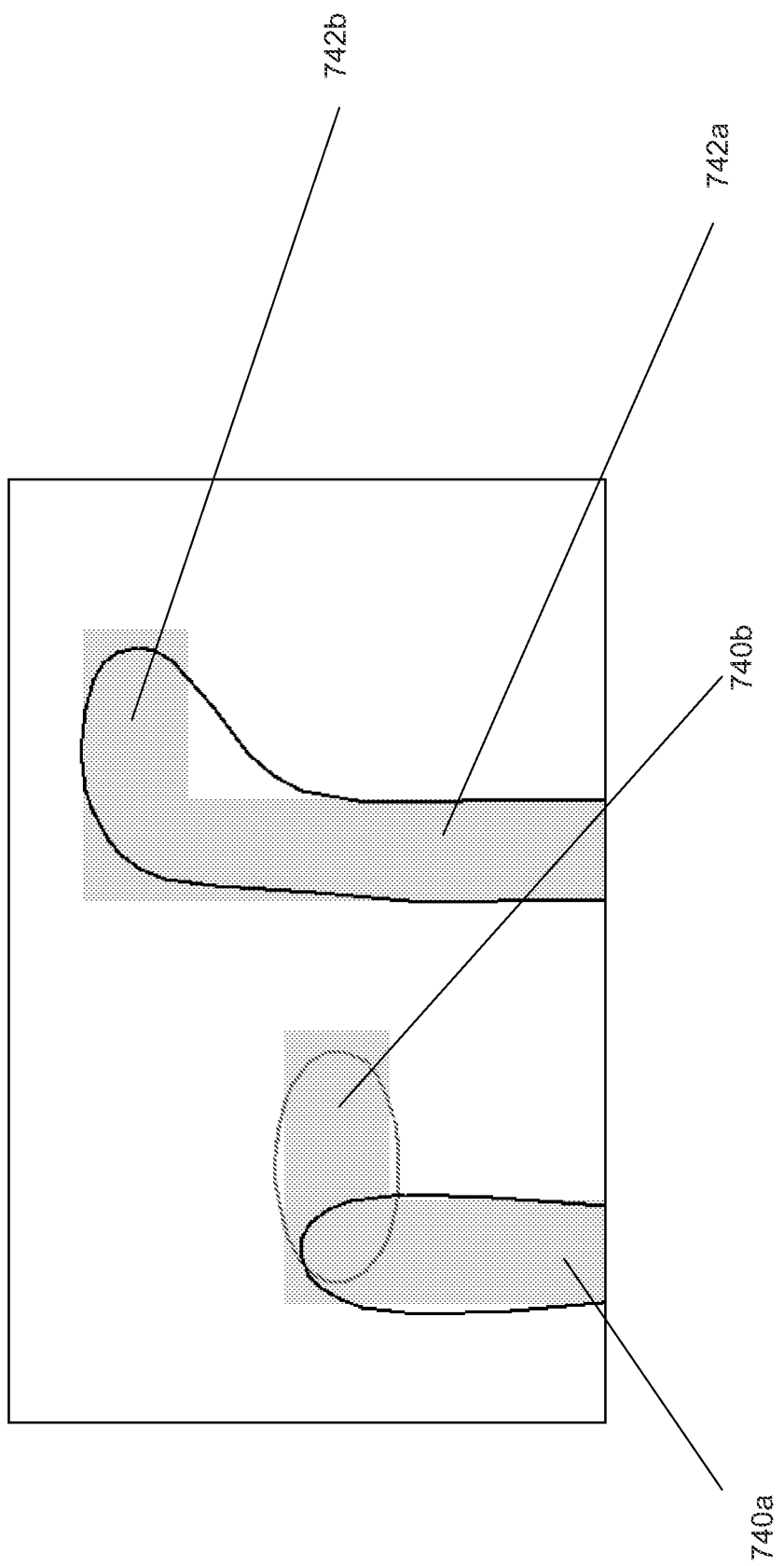

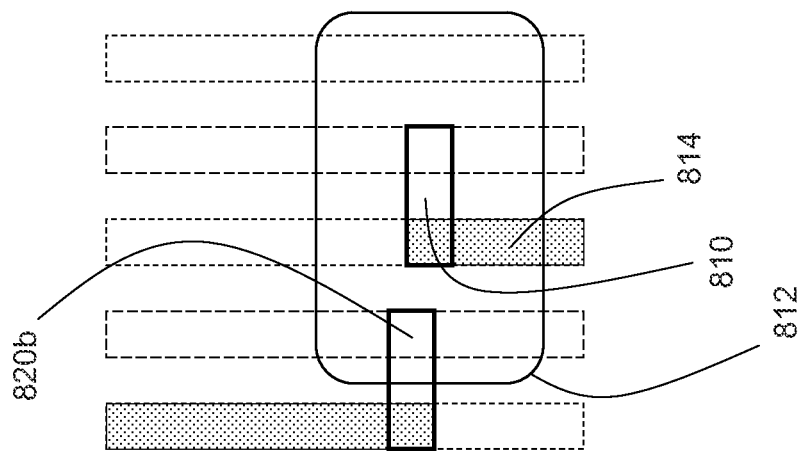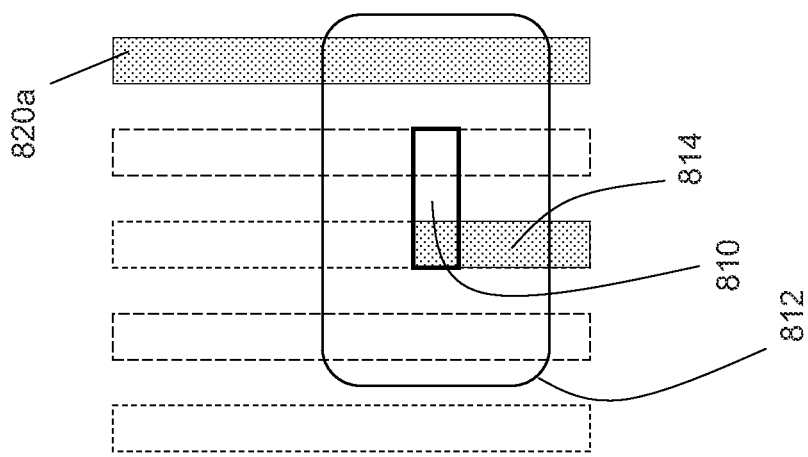

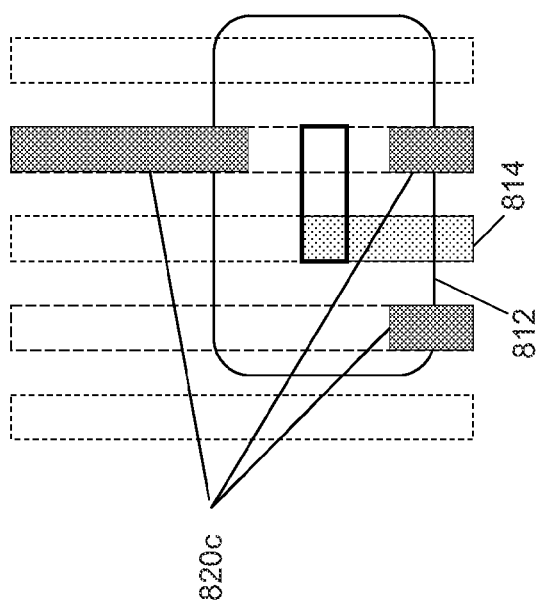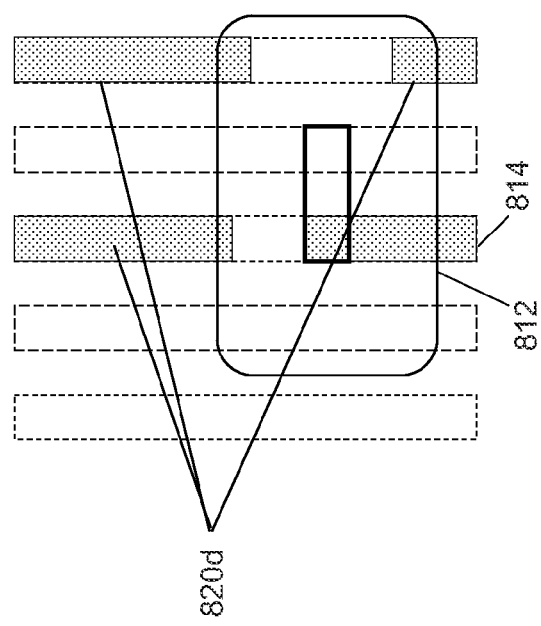
Fig. 8c
Fig. 8d

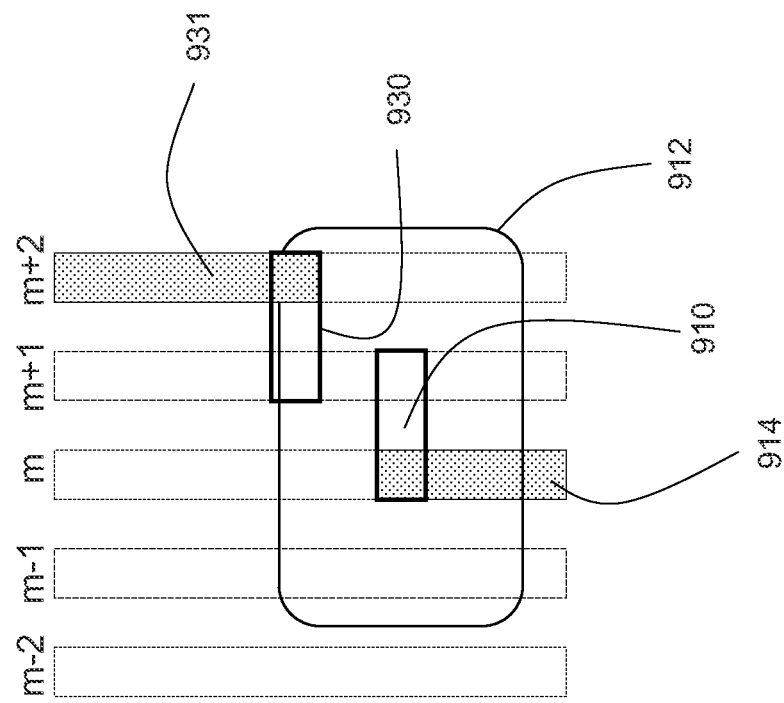
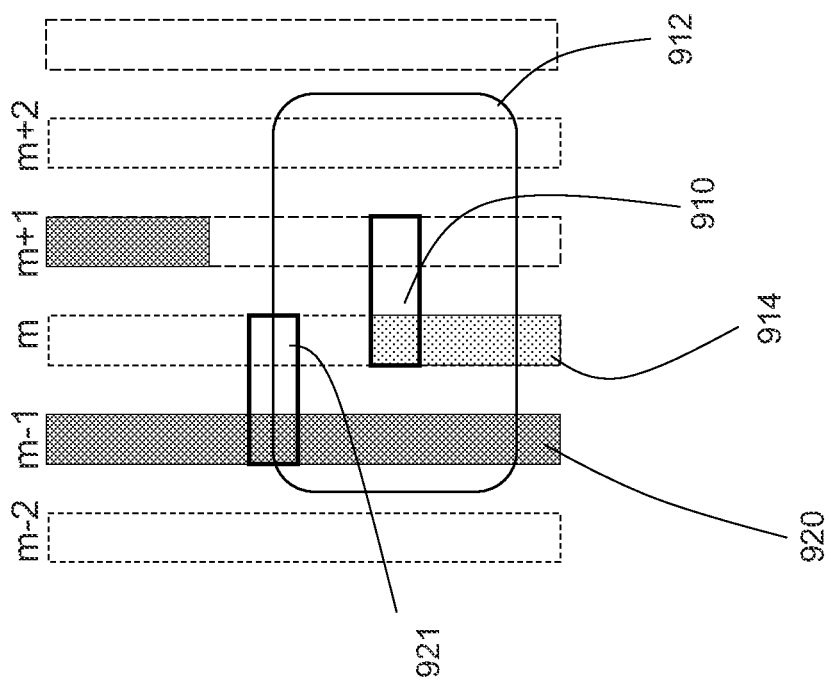

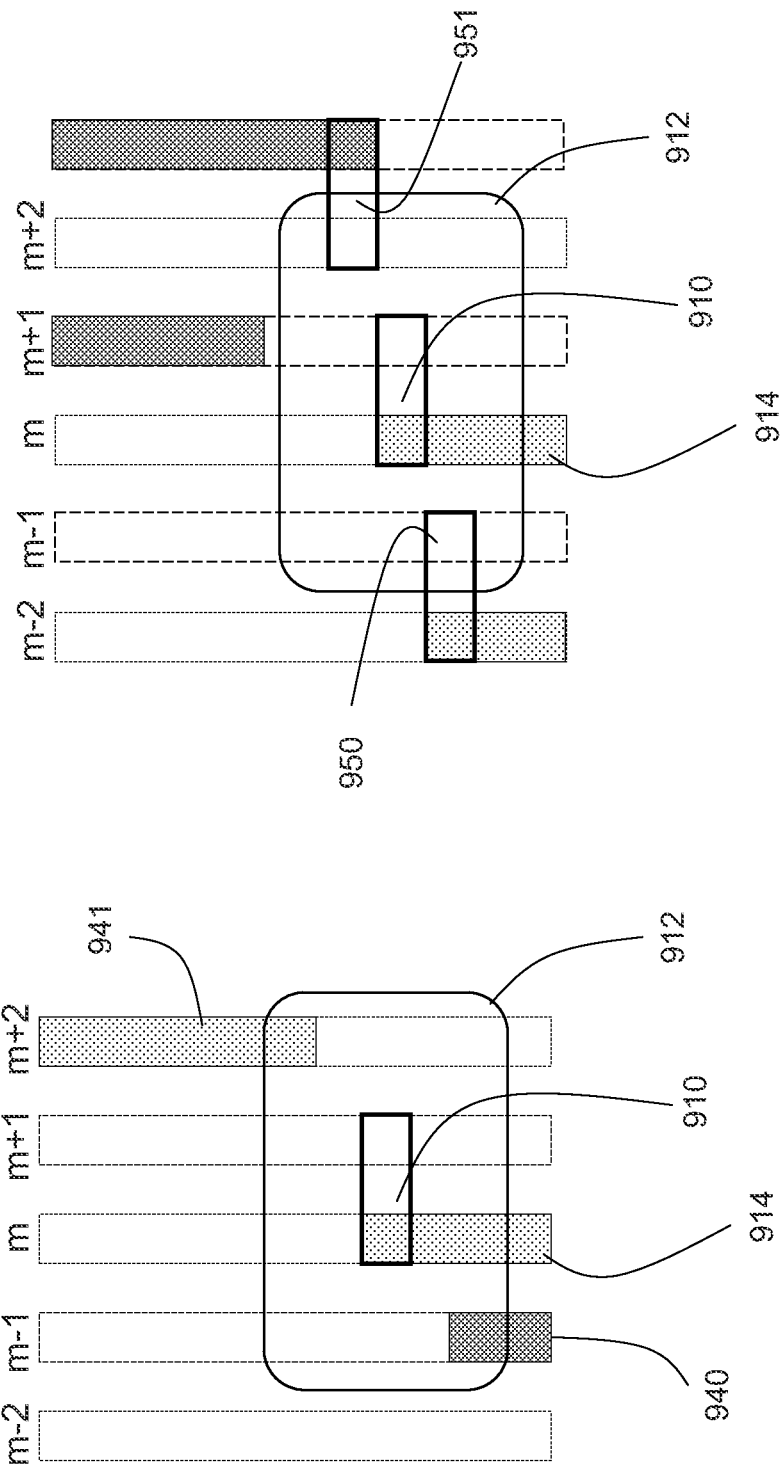

METHOD, SYSTEM, AND PROGRAM PRODUCT FOR ROUTING AN INTEGRATED CIRCUIT TO BE MANUFACTURED BY DOUBLED PATTERNING

CROSS-REFERENCE TO RELATED APPLICATION(S)

The present application claims the benefit of U.S. Provisional Application No. 61/226,261, filed on Jul. 16, 2009, which is hereby incorporated by reference in its entirety.

TECHNICAL FIELD

This invention concerns electronic design automation for routing interconnections of an integrated circuit that is manufactured using a double patterning method.

BACKGROUND

Integrated circuits, or ICs, are created by patterning a substrate and materials deposited on the substrate. The substrate is typically a semiconductor wafer. The patterned features make up devices and interconnections. This process generally starts with a designer creating an integrated circuit by hierarchically defining functional components of the circuit using a hardware description language. From this high-level functional description, a physical circuit implementation dataset is created, which is usually in the form of a netlist. This netlist identifies logic cell instances from a cell library, and describes cell-to-cell connectivity.

A layout file is then created using the netlist. This is accomplished through a placing and routing process, which assigns logic cells to physical locations in the device layout and routes their interconnections. The physical layout is typically described as many patterned layers, and the pattern of each layer is described by the union of a set of polygons. The layout data set is stored, for example in GDSII ("Graphic Data System II") or OASIS ("Open Artwork System Interchange Standard") formats. Component devices and interconnections of the integrated circuit are constructed layer by layer. A layer is deposited on the wafer and then it is patterned using a photolithography process and an etch process. One or more photomasks are created from the layout file for the photolithography of each layer. Photomasks are used to transfer the layout pattern onto the physical layer on the wafer. A photomask, or mask, provides an image of the desired physical geometries of the respective integrated circuit layer. Passing light through the mask projects the layout pattern for the layer onto the wafer. An imaging lens system projects and focuses the layout onto the substrate. The projected light pattern interacts with a photosensitive resist coating on the wafer and, resist portions that are exposed to light are rendered either soluble or insoluble in a developer solution, depending on the type of the photoresist. Accordingly, the mask pattern is transferred into the photo-resist by optical projection and chemical reactions. The photo-resist pattern is subsequently transferred to an underlying layer by an etch process. Most commonly, plasma containing chemically-selective reactive ions is used to etch high-aspect ratio trenches and holes with close to vertical sidewalls.

With a continuing desire to provide greater functionality in smaller packages and the evolution of system-on-chip and mixed-signal designs, IC feature geometries are being driven to smaller and smaller dimensions. However, the ability to project an accurate image of increasingly smaller features onto the wafer is limited by the wavelength of the light used, and the ability of the lens system. The minimum feature size that a projection system can print can be expressed by:

$$CD = k_1 \frac{\lambda}{NA}.$$

where CD, critical dimension, is the minimum feature size; $k_1$ is a dimensionless coefficient of process-related factors; $\lambda$ is the wavelength of light used; and NA is the numerical aperture of the projection lens as seen from the wafer. The equation above is not a black-and-white absolute limit. The yield of the lithographic process gradually decreases, and its cost increases, as $k_1$ decreases below 0.35. Reducing $k_1$ below 0.28 for a single exposure is not practical. There is a fundamental, hard limit for the pitch of a periodic pattern:

$$\text{Period} \geq 0.5 \frac{\lambda}{NA}$$

The pitch limit cannot be violated, irrespective of the photomask and resolution enhancement technologies that may be used, when using a resist employing a single-photon reaction. The reason for this limitation is that the optical intensity image produced inside the photo-resist is band-limited in the spatial-angular-frequency domain. When the intensity image is Fourier transformed with respect to the x and y coordinates (coordinates in the plane of the wafer), the support of the transformed intensity image is contained in a disk of radius $4\pi NA/\lambda$. Patterns that can be printed by a single lithography step are approximately level curves of such band-limited functions.

Presently, the most advanced high-volume lithography technology uses 193 nm wavelength Argon fluoride (ArF) excimer laser as a light source and a projection lens with 1.35 numerical aperture, which cannot print pitches smaller than 67 nm in a single lithography step. Accordingly, the resolution limit of conventional lithography technology is increasingly being challenged by the shrinking dimensions of critical IC feature geometries.

Double Patterning: One class of technologies used to enhance feature density is referred to as double patterning or multiple patterning. There are several types of double patterning in use, the most common being: litho-etch-litho-etch (LELE); litho-freeze-litho-etch (LFLE); self-aligned double patterning (SADP), also known as spacer-assisted double patterning, or sidewall image transfer (SIT).

Litho-etch-litho-etch process and the Litho-Freeze-Litho-etch process decompose the layout into two parts, each of which is approximately the level curve of a properly band-limited intensity image. The decomposition is similar to coloring a geographical map using two colors such that no two neighboring countries have the same color. By analogy, the decomposition of the layout into two parts can be called "coloring the layout." Features that are assigned the first "color" are printed by a first lithography step, and features that are assigned the second color are placed printed by a second lithography step. In this terminology, color is merely an index, not a physical color.

Trench-decomposition variant of Litho-Etch-Litho-Etch: According to the trench-decomposition variant of LELE, the pattern is expressed as the union of two sets of trenches. The trench-decomposition LELE method is topologically suitable for double patterning damascene metal layers. Now referring to FIGS. 1a-d, the first set of trenches 1 is etched into a hardmask 2 by using a first lithography step and a first etch step (FIG. 1a) and an anti-reflective coating 4 and a second photo-resist 5 are spun on the hardmask (FIG. 1b). The second set of trenches 7 are etched into the hardmask 2 by a second lithography step (FIG. 1c), and a second etch step is performed (FIG. 1d). The union of the two set of trenches 1 and 7 in the hardmask 2 are transferred into an underlying layer by a third etch process (not shown). A hardmask is usually a film deposited on top of the layer to be patterned. The hardmask and the layer to be patterned are chemically distinct so that they can be selectively etched, one at a time.

SADP (SIT) method is a known method of double patterning [C. Bencher, "SADP: The Best Option for 32 nm NAND Flash," Nanochip Technology Journal, Issue 2, 2007]. Referring to FIGS. 2a-c, in the SADP method, a core (also called mandrel) pattern 10 is formed on a wafer by a lithography and an etch process (FIG. 2a). The core pattern 10 is formed over a dielectric layer 15 which is deposited on a wafer 20. A spacer material 25, for example $Si_3N_4$, is deposited on the core pattern (FIG. 2b). The spacer material is etched by a plasma process in a way that etches horizontal surfaces faster. FIG. 2c shows the cross-section of the wafer after the spacer-etch process. Sidewalls of features (islands) in the core pattern 10 are covered by spacers 35.

Wire-by-trench variant of SADP: In wire-by-trench SADP process, the spacer pattern defines the dielectric between metal connections. Core pattern 10 is removed by a chemically selective etch process, leaving behind sidewall spacers 35 (FIG. 2d-1). The sidewall spacer pattern is transferred to the dielectric layer 15 using an etch process (FIG. 2e-1). There may be one or more hardmask layers between the spacers 35 and the dielectric layer 15. In that case, the spacer pattern is transferred into the dielectric layer 15 using multiple etch processes. Trenches are formed in the dielectric layer. Via holes (not shown) are etched at this step in the dual damascene process. Trenches and vias holes are filled by metal. In the damascene process, trenches are coated by barrier and seed layers, and copper is electro-deposited into the trenches and vias. Excess copper is removed by a CMP (chemical-mechanical planarization) leaving copper 40 only in the trenches and vias (FIG. 2f-1).

Wire-by-Spacer Variant of SADP: In wire-by-spacer SADP process, the spacer pattern defines the metal interconnection pattern. The conceptually simplest way of achieving this would be to make the spacers out of metal. This is not practiced because there is not a good etch process for copper, which is the interconnection metal preferred for its high conductance. Wire-by-trench method follows the steps of FIG. 2a-c. Then, the spacers are covered by the core material 50, or a chemically similar material, as shown in FIG. 2d-2. This deposition fills the spaces between the spacers 35. The spacers and core material are thinned by CMP (FIG. 2e-2) to make the cross-section of the spacers more rectangular. The spacers are removed by a chemically selective etching process (FIG. 2f-2). Where the spacers 35 were, are now trenches 36. The trench pattern is transferred by an etch process to the dielectric layer that will support the wires (FIG. 2g-2). Via holes (not shown) are etched at this step according to the dual damascene process, using a separate lithography and etch step. Trenches in the dielectric layer 37 and via holes are filled with metal. Finally, metal 37 is in the position of the spacers, and dielectric is in the position of the core 51 and spaces between spacers 52.

Limitations of Double Patterning: LELE Double patterning cannot print a set of odd number of features when each feature is at a minimum critical distance from another feature in the set. Such sets of features can be called odd cycles or color conflicts. Odd cycles can be arbitrarily large both in physical extent and in number of features. Presence of odd cycles cannot be checked by a local operation. In this case, "local" means limited to a neighborhood of the wafer (x-y) plane, such that the diameter of the neighborhood is less than several times (e.g., 5 times) the minimum feature dimension. Similarly, if an odd cycle is detected, it cannot necessarily be repaired by a local operation without creating another odd cycle. Prior art double patterning teaches resolving a color conflict by breaking up a feature into overlapping pieces, and coloring the pieces in different colors. For example, breaking one of the features into two in an odd cycle makes even number of features. However, the new coloring scheme can produce a new color conflict. If a layout is created disregarding limitations of double patterning, a valid decomposition may not be achieved within an acceptable time or amount of computation.

Damascene Process: Damascene process is used to make copper interconnections in integrated circuits. In the damascene process, interconnections are etched as trenches into a dielectric layer, such as $SiO_2$ or TEOS. The trenches are lined with a thin film of a diffusion barrier such as titanium nitride or tantalum nitride. The barrier film prevents metal atoms from diffusing into the dielectric. Trenches are then lined with a thin film of conductive layer that seeds electro-deposition. The barrier and seed layers are typically deposited by a physical or chemical vapor deposition. The trenches are filled with a metal, typically copper, by a wet electro-deposition process. Electro-deposition not only fills the trenches but coats the wafer with an excess layer of metal. Excess metal is removed by chemical-mechanical planarization, which leaves metal only in trenches and vias. Metal trenches (wires) at different layers are connected by vertical interconnections called vias. Vias are made by etching holes in a dielectric layer and filling the holes with metal. Dual damascene process etches a layer of trenches and a layer of via holes (also called via cuts), in two separate lithography steps. Vias are etched deeper than the trenches, down to the previous metal layer. There is a trench-first dual damascene process and a via-first dual damascene process. In either variant of the dual damascene process, via holes and trenches are metal filled in one set of barrier, seed, and metal depositions. Conventionally, the trench layer is patterned with a single lithography step, and associated via holes are patterned with another single lithography step. Manufacturing of logic devices below the 22 nm node may require double patterning of either or both of the trench layer and the via hole layer.

Single-cut and double-cut vias: Some wires on adjacent routing layers are connected by vias. Vias can be single-cut or double-cut. A single-cut is usually drawn as a square, but reproduces having approximately a circular cross-section in the x-y plane due to the limited resolution of lithography. In three dimensions, a single cut via is approximately a circular cylinder. The diameter of a single-cut via is comparable to the width of a wire (trench). Single-cut vias have some probability of being either open circuit or having an unacceptably high resistance due to variations in lithography, etch, and deposition processes. Double-cut vias are used to lower the probability of having poorly connected vias. A double-cut via is either two adjacent vias connected in parallel, or preferably one via that is drawn having a rectangular cross-section, which is rendered as an oblong cross-section by lithography. The long dimension of a rectangular double-cut via is two times the wire width or greater, and its short dimension is comparable to the wire width. Where wires in adjacent layers have alternating preferred directions, a double-cut via necessarily has its long direction perpendicular to the preferred direction of one of the two layers it connects.

SUMMARY

Embodiments of the present invention provide a method, apparatus, and program product for routing an electronic design using double patterning that is correct by construction. The layout that has been routed will by construction be designed to allow successful manufacturing with double patterning, since the router will not allow a routing configuration in the layout that cannot be successfully manufactured with double patterning.

BRIEF DESCRIPTION OF THE DRAWINGS

FIGS. 1a-d show steps of trench-decomposition litho-etch-litho-etch double patterning in cross-section view according to related art.

FIGS. 2a-c show steps of self-aligned double patterning in cross-section view according to related art.

FIGS. 2d-2, 2e-2, 2f-2, and 2g-2 show steps of wire-by-spacer variant of self-aligned double patterning in cross-section view according to related art.

FIG. 4b shows a wide wire according to an embodiment of the invention.

FIGS. 5a-b show flowcharts of approaches for routing for LELE according to some embodiments of the invention.

FIGS. 7a-b show simulated contours of a metal layer routed according to an embodiment of this invention.

FIGS. 8a-d show examples of allowed configurations of a wrong-way connection according to an embodiment of this invention.

FIG. 9a-d shows in plan view, examples of disallowed configurations of a wrong-way connection according to an embodiment of this invention.

DETAILED DESCRIPTION OF THE EMBODIMENTS OF THE INVENTION

Embodiments of the present invention provide a method, apparatus, and program product for routing an electronic design using double patterning that is correct by construction. As noted above, conventional approaches to implementing double patterning may fail since the design layout that has already been routed may not be amenable to manufacturing with double patterning in a successful or cost effect way. Using the present invention, the layout that has been routed will by construction be designed to allow successful manufacturing with double patterning, since the router will not allow a routing configuration in the layout that cannot be successfully manufactured with double patterning.

Figures 1, 2D:
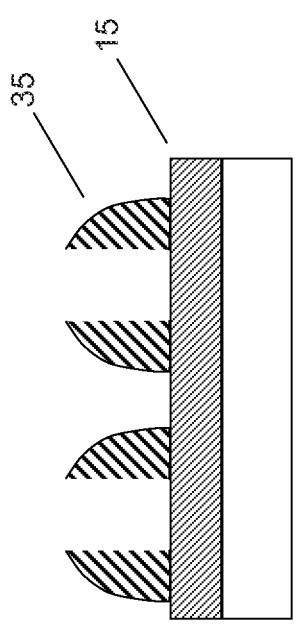
FIGS. 2d-1, 2e-1, and 2f-1 show steps of wire-by-trench variant of self-aligned double patterning in cross-section view according to related art.
Figures 1, 2E:
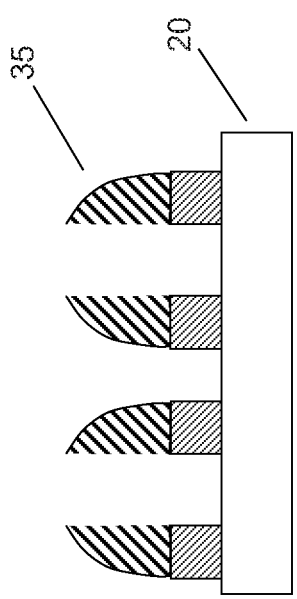
Figures 1, 2F:
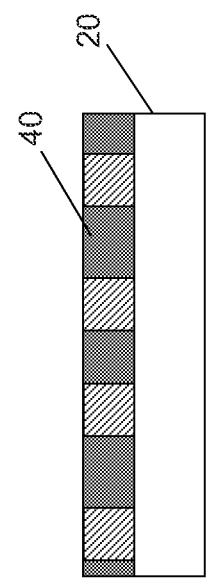
Figure 3:
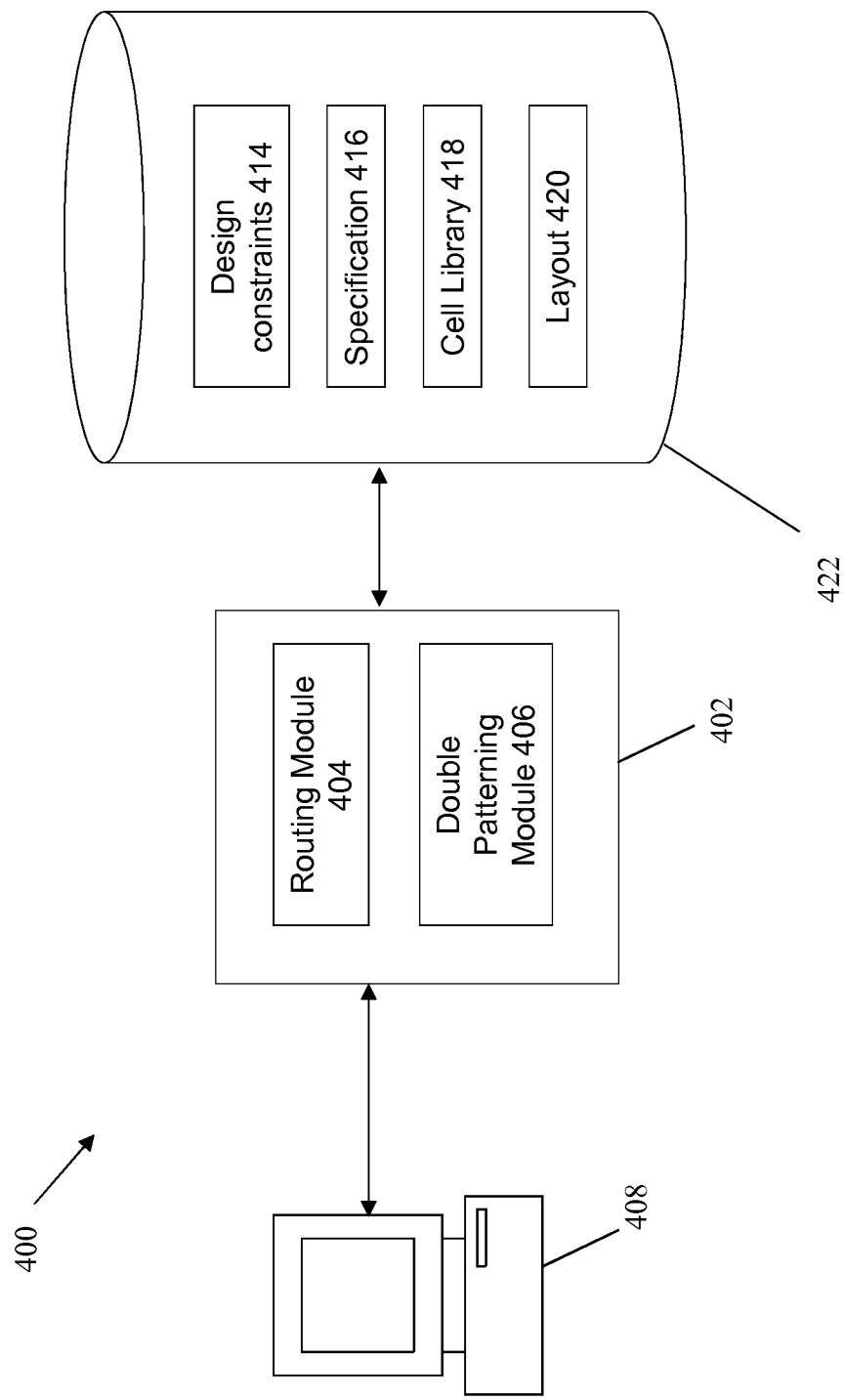
FIG. 3 shows a system with which the invention may be practiced.

FIG. 3 illustrates a general architecture for using a system 400 to perform routing with double patterning according to some embodiments of the invention. System 400 includes a layout/place and route tool 402, which in some embodiments is a computer aided design (CAD) tool or electronic design automation (EDA) tool that has the capability to generate layout and mask designs for an electronic design.

EDA tool 402 includes a routing module 404 to route an electronic design to generate a layout 420. The routing module 404 operates based upon one or more design specifications 416 and one or more design constraints 414. The design constraints 414 may include one or more constraints that are imposed to guarantee the ability of a double patterning module 406 to generate mask designs that are capable of manufacturing the routed layout 420. For example, as described in more detail below, the one or more design constraints 414 may include rules regarding the specific lithography groupings of routing channels on the layout, as well as specific rules regarding the "color" of "wrong way" wires in the layout. One or more cell libraries 418 may contribute cells that are routed by wires in the layout 420.

Data in the system, such as the design specifications 416, constraints 414, and cell libraries 418 may be stored in one or more computer readable mediums 422. The layout and mask designs 420 generated by the EDA tool 402 may be stored in the computer readable medium 422.

One or more users may operate EDA tool 402 using one or more user stations 408. The one or more user stations 408 may include a display device for displaying visual information during the operation of EDA tool 402 or to display the results of operating the EDA tool, e.g., to display layout 420.

In an embodiment, a routing algorithm assigns a preferred direction to the wires in each routing layer. The preferred direction, x or y, is in the plane of the wafer. Metal layers have alternating preferred directions. The direction that is perpendicular to the preferred direction is the "wrong-way." By analogy, the present document will sometimes refer to the preferred direction as the "right-way." In one embodiment, wires in a layer are oriented only in the preferred direction. In a preferred embodiment, wrong-way connections are allowed but with a penalty in a cost function. The routing algorithm minimizes a cost function. The value of the cost function increases with increasing number or length of wrong-way connections.

An array of parallel lines is referred to herein as a line-grating. Consider a line-grating, having lines oriented in the preferred direction, and the line-grating covering the area to be routed. The grating lines can equivalently be called "tracks." The routing algorithm places right-way wires centered on the tracks. Conceptually, the right-way wires are made by removing portions of grating lines. Assume that the tracks are numbered as 1, 2, 3, etc. Thus, given any piece of right-way wire, its centerline is one of the tracks having a specific integer index. Many wires that are not electrically connected to each other can be lined up on the same track. Therefore, there is not a one-to-one correspondence between tracks and wires.

Embodiment Using LELE Method

Figure 4A:
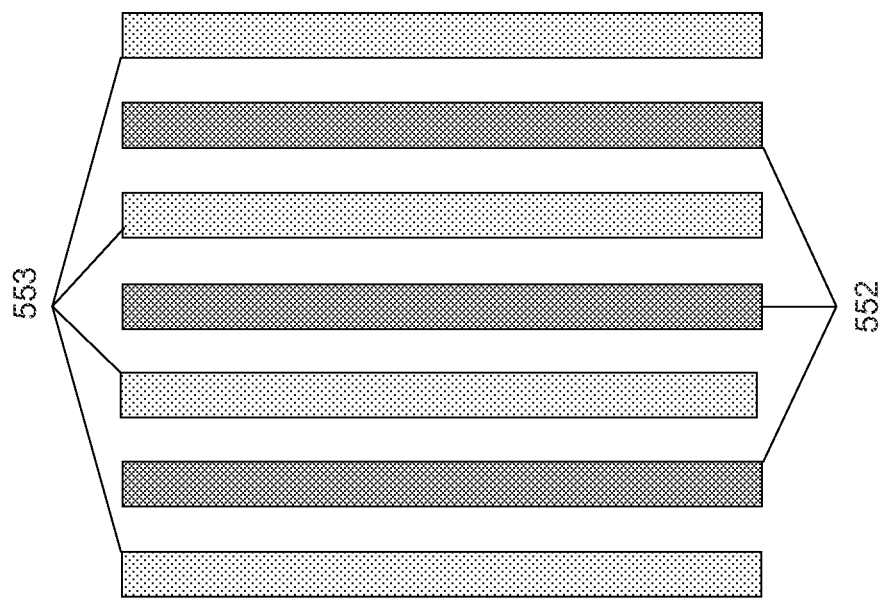
FIG. 4a illustrates assignment of colors to wiring tracks.

In an embodiment of the invention, litho-etch-litho-etch and dual damascene methods are used to make interconnections of an integrated circuit. Wires on even numbered tracks are formed by a first lithography step (first "color"), and wires on odd numbered tracks are formed by a second lithography step (second "color"). This is illustrated as shown in FIG. 4a, in which wires 553 in a first color are manufactured by a first lithography step and wires 552 in a second color are manufactured by a second lithography step.

Wide wires are made as shown in FIG. 4b. A wide wire 560 is placed on a track 561 and the neighboring tracks 562a-b are interrupted next to the wide wire. The wide portion 560 of the wire is assigned the opposite color of the track 561 on which wide wire 560 is placed. The wide portion 560 and the wire in track 561 can overlap partially or along the entire length of the wide wire. Gap 563 along the preferred direction between wide wire 560 and a wire on neighboring tracks 562b is large enough to be resolved by a single lithography step. Wide wire 560 can be up to 5 minimum widths without interrupting neighboring tracks other than 562a-b. Wide wire 560 can be broken into multiple parallel lines that overlap with a wire in track 561, in order to unify the pitch of the pattern on the photomask containing wide wire 560. A uniform pitch offers a lithographic advantage.

Figure 5A:
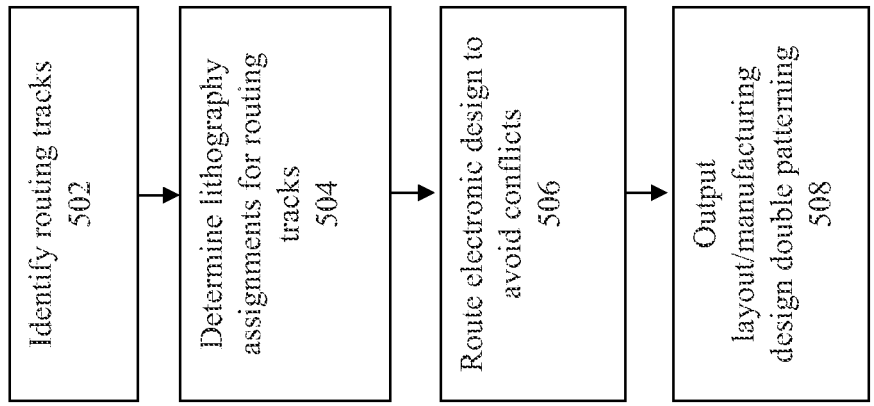

FIG. 5a shows a flowchart of a general process for routing based upon color assignments for, where the assignment of colors ensures that right-way wires cannot have color-conflicts. This is because the tracks are pre-colored in alternating colors, and right-way wires assume the color of the track on which they are placed. The process begins at 502 by identifying routing tracks in the IC floorplan. Any suitable approach can be taken to identify the routing tracks, e.g., based upon the identification and contours of grids or channels for the design. The locations and spacings between the tracks should be selected such that a wire along every other track can be adequately printed with a single lithography step.

Next, at 504, color assignments are made for the routing tracks in design. This can be accomplished by assigning the same color to alternating tracks, where all tracks having an even number are associated with a first color and all tracks having an odd number are associated with the second color.

At 506, routing is performed in a manner that avoids color conflicts. When wires are only routed in the preferred directions, there will never be a color conflict since the track spacings and locations have been pre-selected in a manner that will guarantee that that printing with two lithography steps will be usable to manufacture the layout. This is because the distances between even wires are sufficient to allow printing with the first lithography step, and the distances between odd wires are likewise sufficient to allow printing with the second lithography step. Gaps between ends of wires on the same track are sufficiently large to be resolved with a single lithography step. At 508, the routed design would be generated and either displayed to the user on a display device or output as a stored file, e.g., as a GDSII file.

It is possible that the layout may include wires that do not extend only in the preferred directions. For example, the layout may include wrong-way wires that interrupt the tracks they cross. In the LELE embodiment, wrong-way wires can extend by any number of tracks.

Figure 6B:
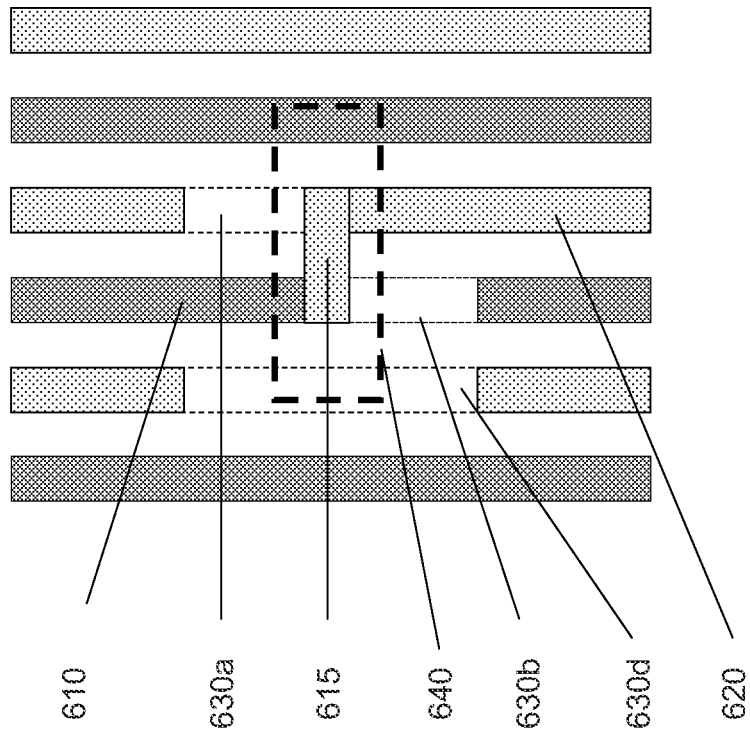
FIGS. 6a-c show views of a wrong-way wire connecting tracks according to an embodiment of this invention.
Figure 6A:
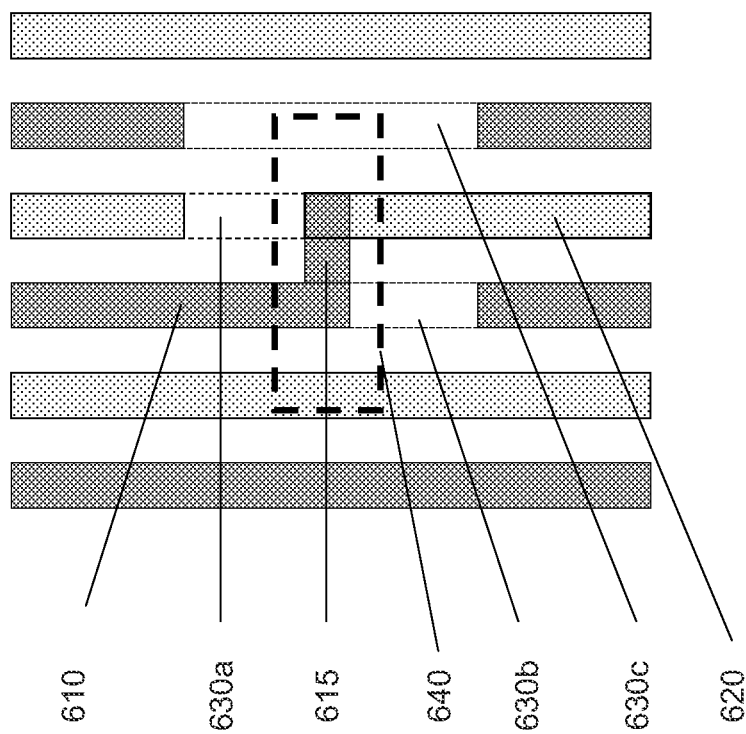

FIG. 6a and FIG. 6b show wrong-way wire 615 connecting adjacent tracks 610 and 620 and interrupting portions 630a and 630b of the tracks. Unoccupied portions of tracks are shown by dashed lines in FIG. 6.

Embodiments of the present invention provide an approach for routing that can route wrong-way wires and still assure the absence of color conflicts to avoid manufacturing problems for double patterning. According to some embodiments, wrong-way wire 615 can be assigned to either color (e.g., can be formed by either the first or the second lithography step), whichever choice avoids color conflicts.

FIG. 5b shows a flowchart of a process for routing wrong way wires based upon some embodiments of the invention. The process begins at 512 by identifying a specific wrong way wire that needs to be routed. Next, at 514, an exclusion zone 640 is formed around the wrong way wire. The exclusion zone is an area around the wrong way wire having spacings measured from the edge of the wrong way wires. The spacings of the exclusion zone are such that they can be resolved with a single lithography step.

The present invention operates to avoid the situation in which the color of the wrong way wire is configured such that a color conflict occurs. According to some embodiments, the routing algorithm does not need to color features as long as it conforms to the following rule: In the exclusion zone, other than the wrong way wire and the right-way wires to which it is connected (610 and 620), there can be at most one of the following three objects: (1) a group of right-way wires on even numbered tracks; (2) a group of right-way wires on odd numbered tracks; (3) another wrong-way connection. Therefore, at 516, the process checks for the presence of these objects.

A determination is made at 518 whether the exclusion zone corresponds to zero or one of these objects. If the answer is yes, then the last routed wire is accepted at 522. The next connection is routed at 524, and if there is another wrong way wire to route, then the process returns back to 512 to route the wrong way wire.

If the determination at 518 indicates that there are two or more identified objects in the exclusion zone, then the last wire is re-routed at 520. Since the present context can be implemented in a recursive process, re-routing the last wire is performed to resolve the identified conflict with an alternate configuration where there exists zero or one of the above objects. The process returns back to 512 once the last wire has been re-routed.

It is noted that if any one of the above three objects intrudes into the safe zone of a wrong-way wire, the wrong-way wire is assigned the opposite color of the intruding object. Since intrusion of more than one object is prohibited, color conflicts cannot occur. By conforming to this rule, the router produces a pattern that has no color conflicts by construction.

Referring to FIGS. 6a and 6b, wrong-way wire 615 has exclusion zone 640. Right-way wires 610 and 620 are not subject to exclusion because they are connected to wrong-way wire 615. Either 630c or 630d must be excluded because at most one of these objects can intersect the exclusion zone.

Figure 6C:
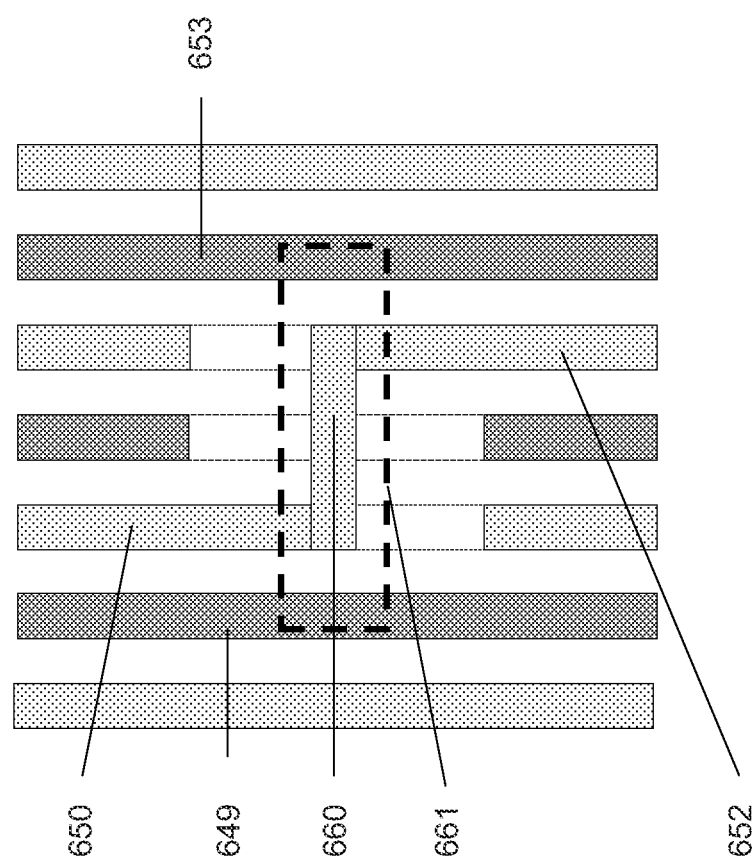

Now referring to FIG. 6c, wires 649 and 653 are allowed to intersect exclusion zone 661 of wrong-way wire 660 because wires 649 and 653 are of the same color (both are on even tracks or both are on odd tracks). Therefore, they count as one object intersecting exclusion zone 661. Wrong-way wire 660 is assigned the opposite color of the object (649, 653) intruding into the safe-zone (the router does not need to make color assignments, but the computational burden of making and saving color assignments is negligible).

Figure 7A:
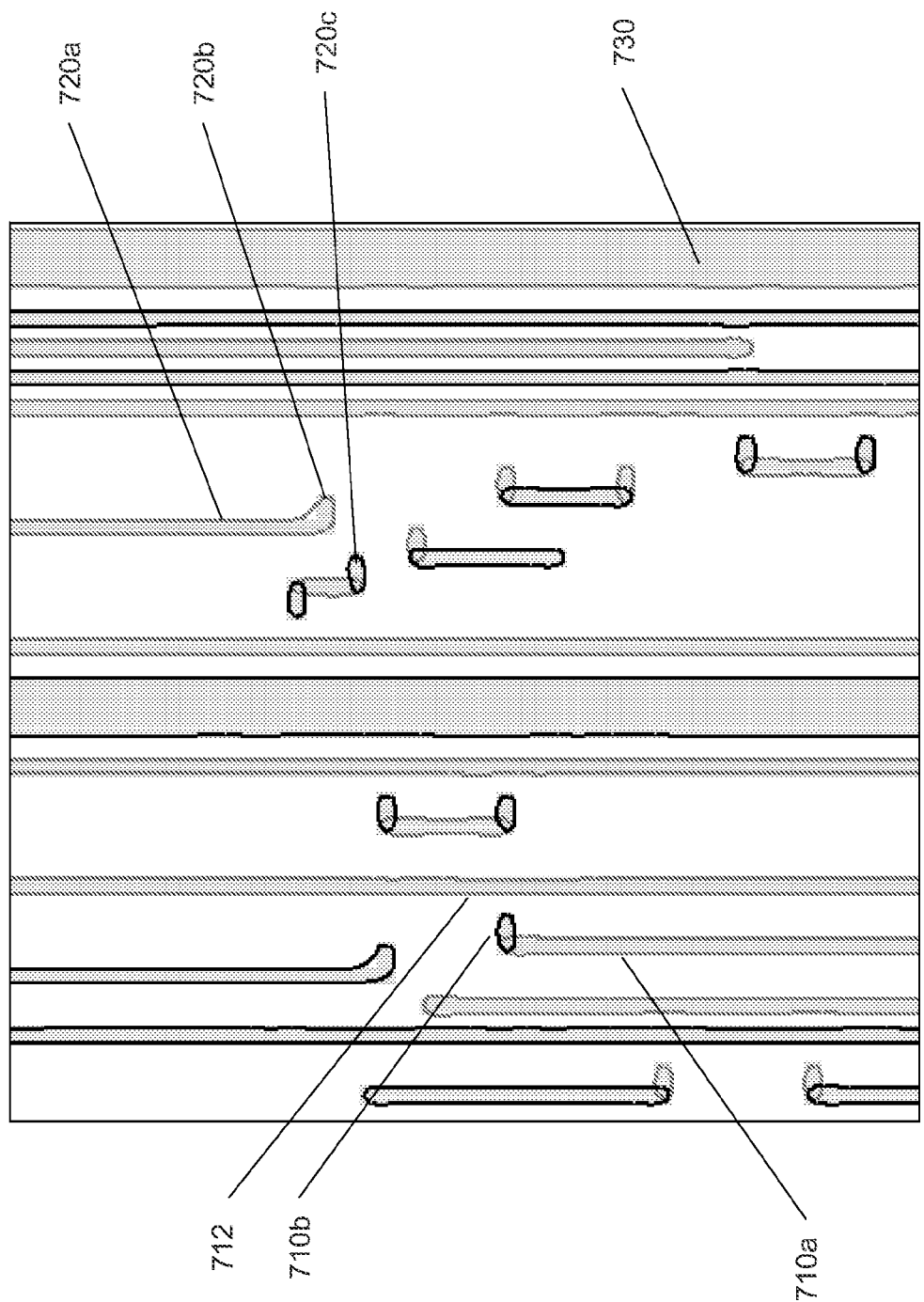

A wrong-way wire can be a pad designed to cover a double-cut via. Such a feature can be referred to as a "wrong-way pad." Wrong-way pads are subject to the same rules as other wrong-way wires. FIG. 7a shows lithography simulation of a routed pattern according to an LELE embodiment of this invention. The simulation is, for example, for the 20 nm logic node (wire pitch=65 nm, $\lambda$=193 nm, NA=1.3, and trench shrink by 15 nm using a trench shrink technology such as SAFIER™ or RELACS™). Features formed at different lithography steps are shown with distinct line types. Wrong-way pad 710b has the opposite color of right-way wire 710a because wire 712 intersects the exclusion zone of wrong-way pad 710b. Wrong-way pad 720b is of the opposite color of wrong-way pad 720c because one wrong-way pad intersects the exclusion zone of the other. This makes wire 720a and its wrong-way pad 720b of the same color, which means they are printed by the same lithography step.

Because lithography has limited resolution, when a wire and its wrong-way pad are printed at the same lithography step, the resulting shape has a smooth and rounded contour. This is illustrated in FIG. 7b in detail. Wire 740a and its wrong-way pad 740b are printed at different lithography steps and they joint at acute angles. Whereas, wire 742a and its wrong-way pad 742b are printed at the same lithography step. Consequently, they join with smooth curves.

Wire 730 in the example of FIG. 7a is an extra-wide power bus with a larger space on either side. The tracks are not necessarily of a constant with and pitch, although using a constant pitch offers lithographic advantages. In the LELE embodiment wrong-way wires can be of a different width and pitch compared to the right-way wires. For example, using dipole illumination in lithography offers the highest possible resolution in one direction. This can be used to print the right-way wires at the densest pitch, at the expense of using a larger width and spacing for wrong-way connections.

FIGS. 8a-d show examples of allowed configurations for a wrong-way pad 810 connected to wire 814. Wrong-way pad 810 has an exclusion zone 812. Unoccupied portions of tracks are shown by dashed lines. Other than the wrong-way pad 810 itself, and wire 814 connected to it, there is one other object intersecting the exclusion zone in these examples: in FIG. 8a, there is only wire 820a in the exclusion zone; in FIG. 8b, there is one other wrong-way pad 820b; in FIG. 8c, there are wires 820c but all are on even-numbered tracks; and in FIG. 8d, there are wires 820d but all are on odd-numbered tracks.

FIGS. 9a-d shows examples of disallowed configurations for wrong-way pad 910 connected to wire 914. Wrong-way pad 910 has an exclusion zone 912. In each example in FIG. 9, two objects intersect the exclusion zone 912: 920 and 921 in FIG. 9a; 930 and 931 in FIG. 9b; 940 and 941 in FIG. 9c; 950 and 951 in FIG. 9d. Having the following in the exclusion zone is disallowed: objects of different colors; more than one object of indeterminate color; or an object of a known color and an object of indeterminate color. The right-way wires have known colors. In one embodiment, wrong-way wires are not assigned colors until routing is finished; therefore they are of indeterminate color during routing. The exclusion rule described above ensures that wrong-way wires can be colored later without color conflicts.

One significant advantage of the present approach is that the above restrictions make the coloring problem local and allows the router to generate a layout with no color conflicts by construction. This approach provides a significant advantage from the perspective of being able to route the design by only considering the routing problem locally, even if the restrictions are conservative and prevent layouts that theoretically may be manufacturable with LELE double patterning. For example, the configuration of FIG. 9a is disallowed, even though it may be possible to manufacture the both wire 921 and wire 910 if 921 is assigned the same color as wire 920 and wire 910 is assigned the same color as wire 914. However, that approach would restrict the ability to make the routing problem local, since the routing of wire 910 would pin the color of 921, which cannot be done without checking the interactions of 921 with its neighbors, and all of its related effects ripple throughout the design making the problem global. The restrictive exclusion zone taught in this invention makes the coloring problem local.

A via inherits the color of the wrong-way pad that covers it. This ensures that the via layer can be double patterned with no color conflicts.

Exclusion zone of wrong-way features. The exclusion-zone around a wrong-way wire excludes other objects of the same color (with the exception of right-way wires to which the wrong-way wire is connected). The safe zone is selected according to the resolution of the lithographic process such that the wrong-way wire should print without the danger of merging with any object outside the exclusion zone on the same photomask. The exclusion zone is an inflated version of the wrong-way wire. The inflation distance, which is not necessarily the same in all directions, can be determined by lithography simulation, or by actually printing test patterns, or both.

Router algorithm to enforce exclusions. The algorithm routes one wire at a time. In an embodiment, the router starts from a state of no violations of exclusion zones and adds one wire in a way that causes no violations. If there is a violation, the last routed wire is removed and rerouted without violations. In another embodiment, the router minimizes a cost function. The cost function includes a term related to the number of violations of exclusion zones of wrong-way connections.

Saving color assignments. In a preferred embodiment, the router saves the color assignments as this can be done with negligible computational burden to the router. Color assignments are saved by placing polygons of the same color in a layer dedicated to that color in a GDSII or OASIS file. The color dedication is indicated assigning in the layout file different layer indices or different purpose indices to the two colors. The two colors are submitted to tapeout RET/OPC (resolution enhancement technique/optical proximity correction) operations separately. This eliminates the need for a separate coloring algorithm. In another embodiment, the polygons outputted by the router are input to an external and separate coloring algorithm. The present invention assures that there is a valid solution for the external coloring algorithm to find.

Embodiment Using Wire-By-Spacer SADP Method

In the wire-by-spacer method, alternating spaces between wires (spacers) must be formed by a core feature. In this embodiment, alternating spaces between tracks are assigned cores. This is equivalent to the two-color assignment of LELE, except spaces between tracks are assigned colors (core or no core) in wire-by-spacer SADP.

Figure 10A:
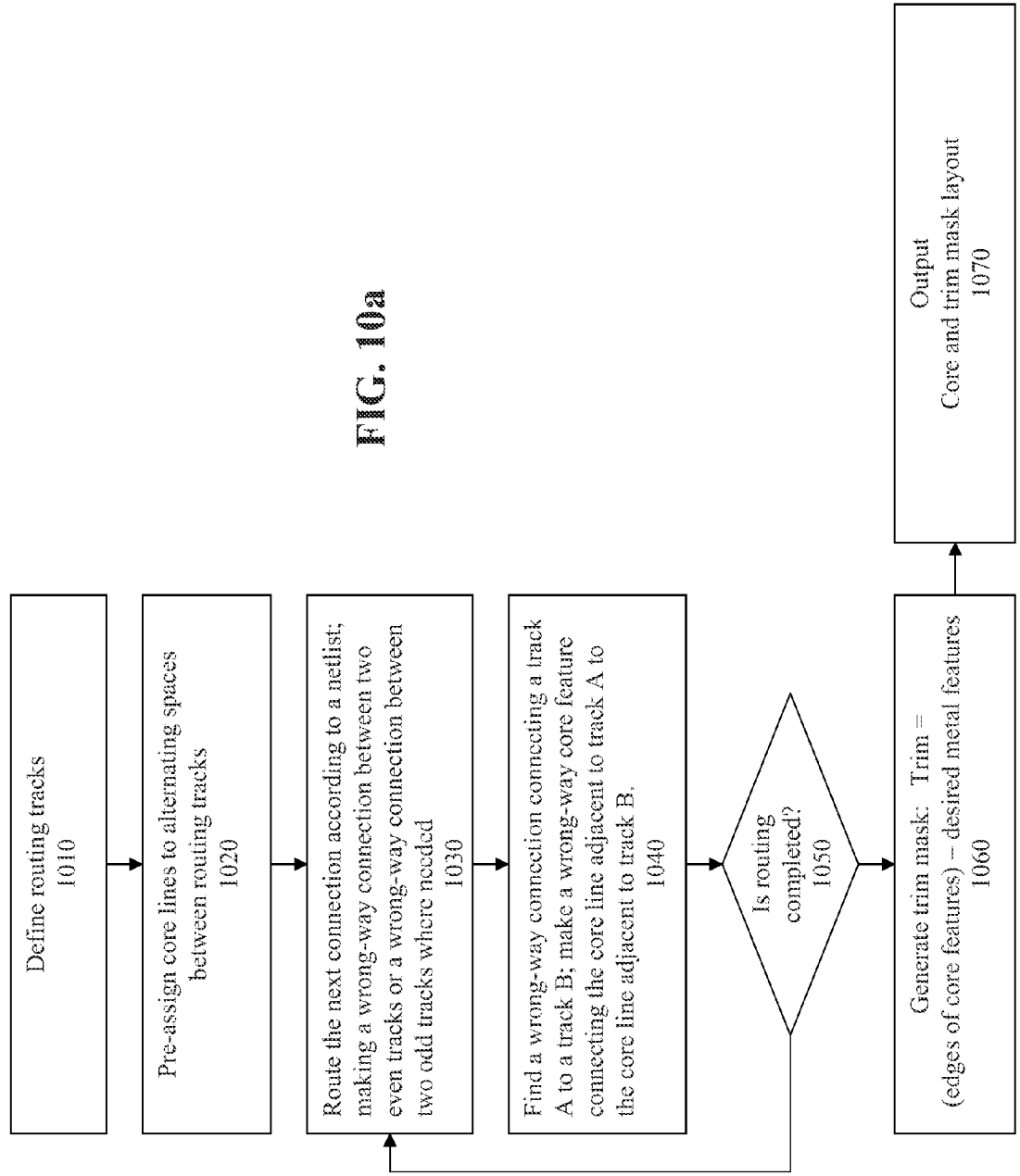
FIG. 10a shows a flowchart of approaches for routing for SADP according to some embodiments of the invention.
Figure 10B:
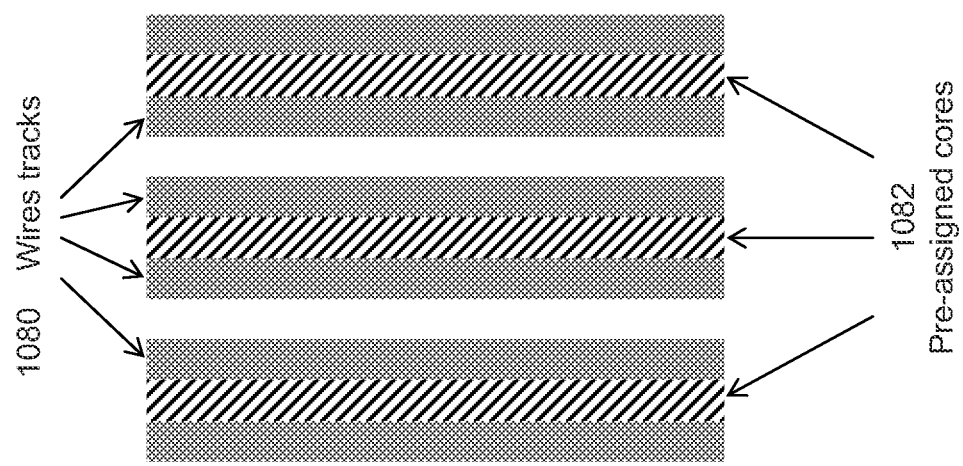
FIG. 10b shows in plan view, that alternating spaces between wires in an array are pre-assigned to be formed by the core pattern in the wire-by-spacer SADP method according to an embodiment of this invention.

FIG. 10a shows a flowchart of a process for implementing wire-by-spacer approach according to some embodiments of the invention. At 1010, routing tracks are defined in the layout. The routing tracks correspond to the allowed locations of wires in the layout. In the wire-by-spacer embodiment, at 1020, core lines are assigned to alternating spaces between tracks. As noted above, this is equivalent to the two-color assignment of LELE, but spaces between tracks are assigned colors in the wire-by-spacer method. For example, referring to FIG. 10b, wires 1080, formed in place of sidewall spacers, have spaces between them. Alternating spaces 1082 are cores. Sidewall spacers are formed on the sidewalls of core features. Consequently, right-way wires are formed along the tracks. Portions of tracks are blocked by the trim mask. There is no possibility of coloring or double patterning conflicts between the right-way wires by construction.

At 1030, the next connection to be made according to a netlist is selected. The connection is routed preferably using the routing tracks. If a wrong-way connection between a track A and a track B is necessary, a wrong-way line is added to the core. Track A is on the sidewall of a core line A'. Similarly, track B is on the sidewall of a core line B'. The wrong-way core feature connects core lines A' to B'. This creates a pair of wrong-way wires one of which may be undesired. Undesired connections are eliminated by the trim process. Track A and track B must be both even tracks, or they must be both odd tracks. In a two-mask SADP process, even tracks and odd tracks cannot be connected at the same metal level. They can be connected by vias to another layer. Wire-by-spacer SADP cannot create junctions of wires such as T-shaped three-way junctions or cross (+) shaped four-way junctions.

Figure 11A:
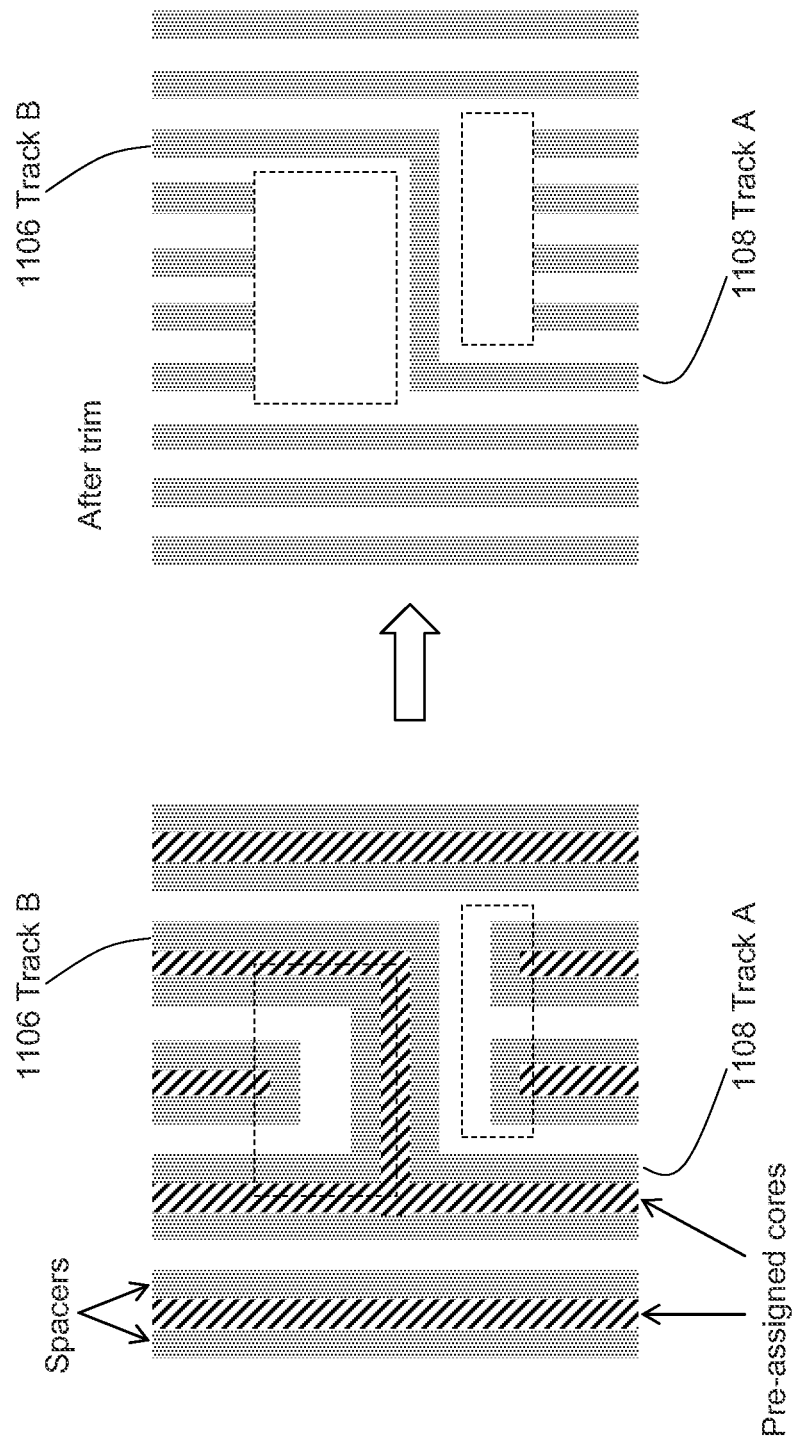
FIG. 11a-c shows in plan view a wrong-way wire connecting tracks using the wire-by-spacer SADP method, according to an embodiment of this invention.
Figure 11B:
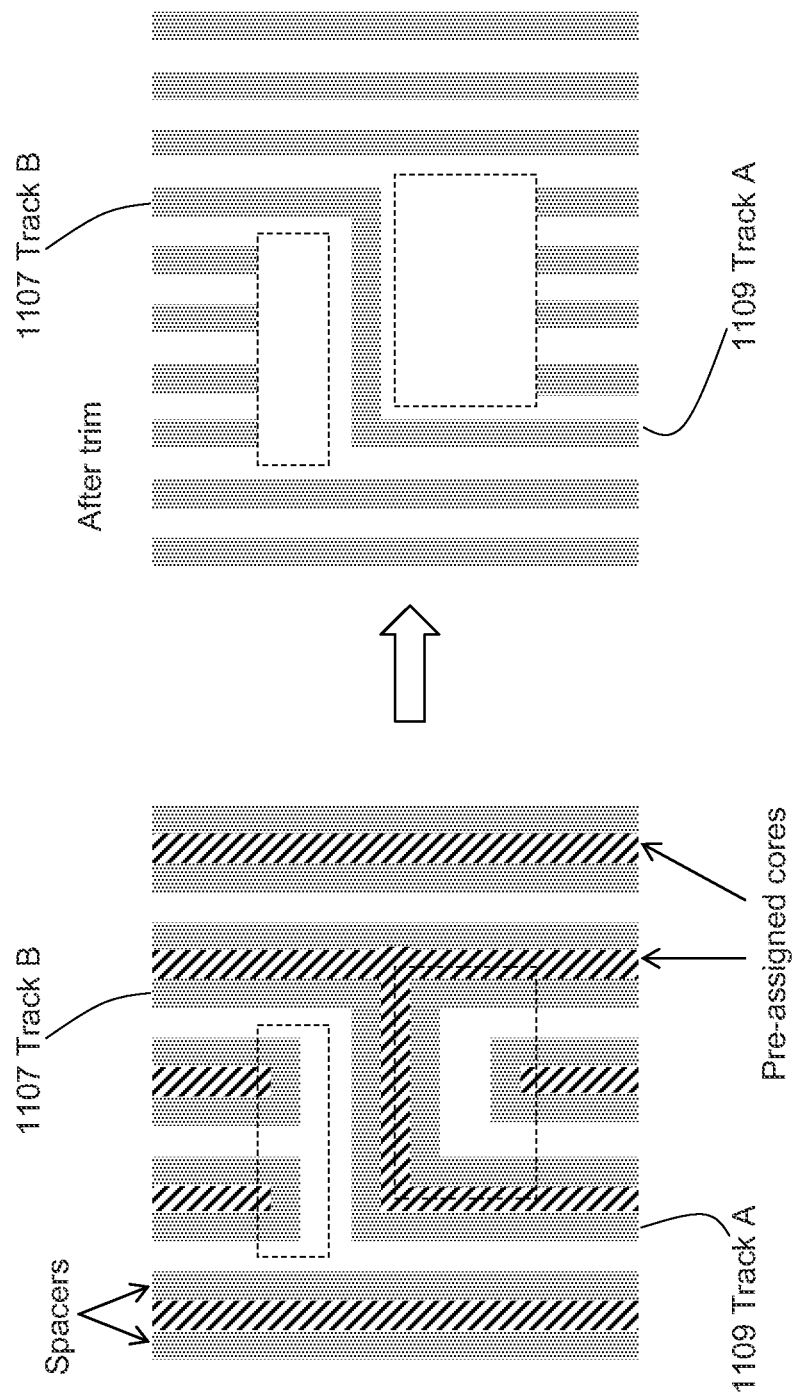
Figure 11C:
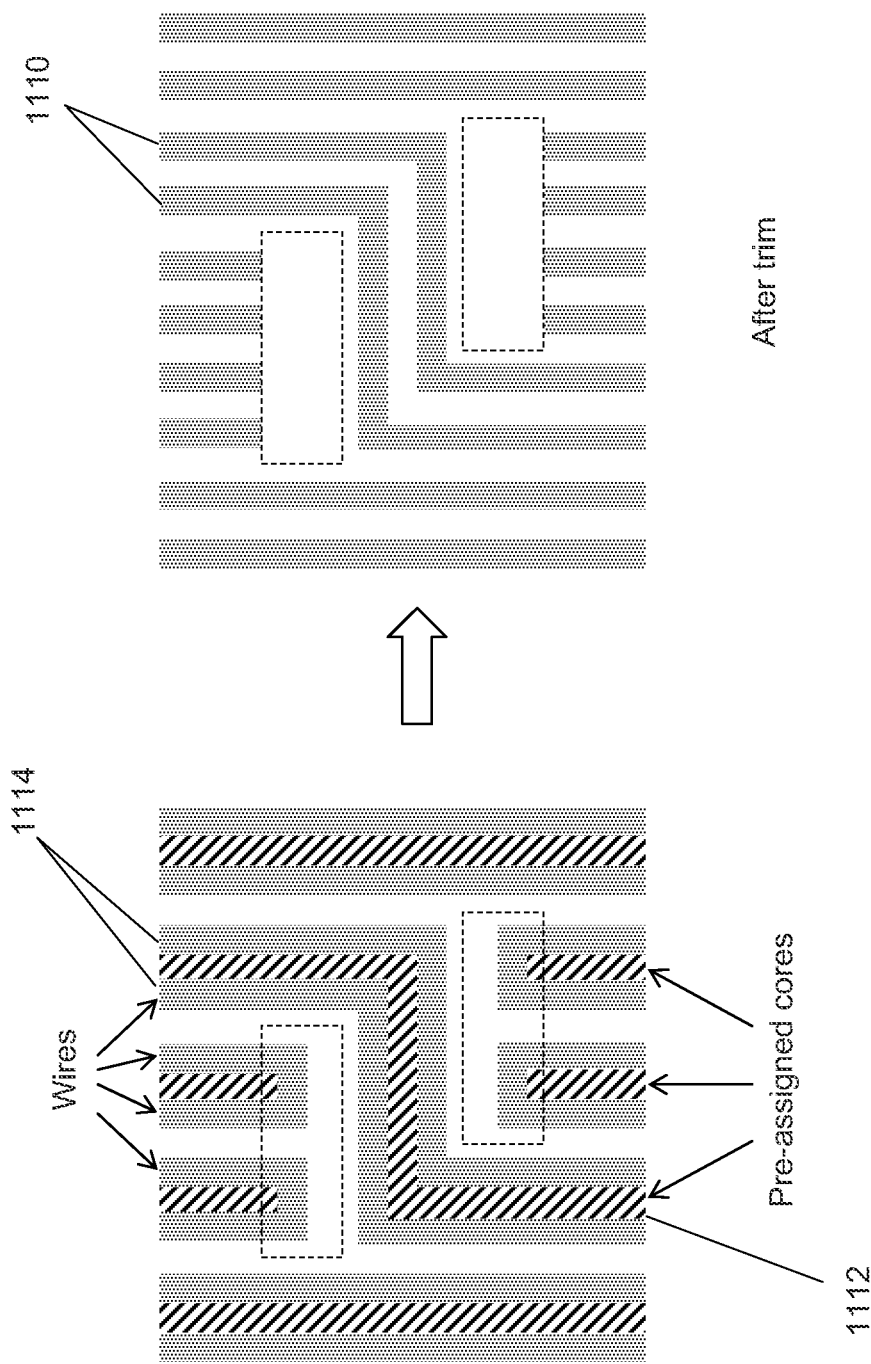

FIGS. 11a-c show that wrong-way wires can be created in the SADP approach subject to a limitation: wrong-way wires can extend by even number of tracks. Wrong-way wires can connect two even-numbered tracks 1106 and 1108 (FIG. 11a), or two odd-numbered tracks 1107 and 1109 (FIG. 11b), using two lithography steps (one for core, another for trim) but they cannot connect an odd-numbered track to an even numbered track without using a third lithography step, or vias to another layer. Wrong-way tracks are created by wrong-way core features. This scheme creates wrong-way wires on either side of the wrong-way core. This is illustrated in FIG. 11a-c. If one of the wrong-way connections is not needed, it can be removed by the trim mask by a second lithography step (1060). The two wrong-way wires 1114 created by one wrong-way core 1112 can be used to make nested wrong-way connections 1110 as shown in FIG. 11c. Using wire-by-spacer SADP, a wrong-way connection takes up a swath that is approximately eight times as wide as the minimum dimension. If both wrong-way connections created by the wrong-way core are used for routing, then two wrong-way connections take up a swath of about eight minimum dimensions.

Thereafter, at 1050, if more connections remain to be made at 1050, the flow returns to 1030. Otherwise, all connections in the netlist have been routed, and trim mask layout is created at 1060. Trim features cover: all spacers created (edges of core features) take out the desired metal features. The core and trim masks are saved at 1070, e.g., in a GDSII or OASIS file.

Embodiment Using Wire-by-Trench SADP Method

In this embodiment, alternating wires, say even ones, are assigned to be formed in place of core features. The process is very similar to the approach described with respect to FIG. 10a, except that core features are etched after spacers are formed on the sidewalls of core features. Complement of spacers becomes trenches. Trenches are transferred into the underlying inter-metal dielectric layer, and transferred trenches are filled with metal. Portions of trenches between the spacers can be blocked by photoresist by using a trim mask in a second lithography step. Blocked trenches are not transferred into the inter-metal dielectric, hence they do not form wires. In summary, complement of spacers, less trim features become metal features.

Wire-by-trench SADP is capable of creating T-junctions and (+)-junctions of wires, because the core can be drawn to have such features, and core is replaced by metal. Non-core trenches can also make a junction 1310 as shown in FIG. 13.

Figure 12:
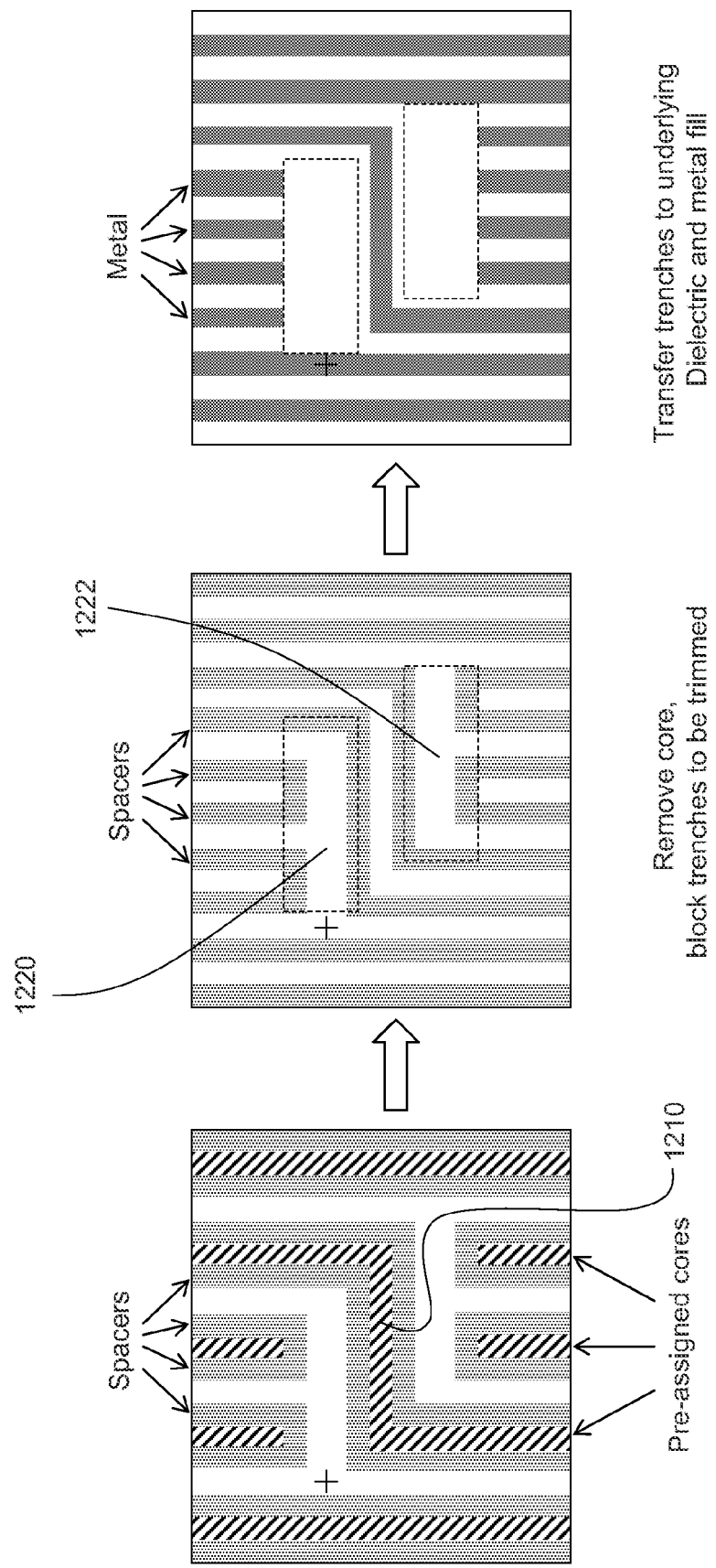
FIG. 12 show in plan view a wrong-way wire connecting tracks using the wire-by-trench SADP method, according to an embodiment of this invention.

Wrong-way connections are created by a wrong-way feature 1210 of the core as shown in FIG. 12. This creates wrong-way connections in groups of three. Unwanted wrong-way connections 1220 and 1222 are eliminated by blocking portions of trenches between spacers with photoresist. FIG. 12 shows making a wrong-way connection in place of a core feature, which can connects two tracks defined by core features, say only even tracks.

Figure 13:
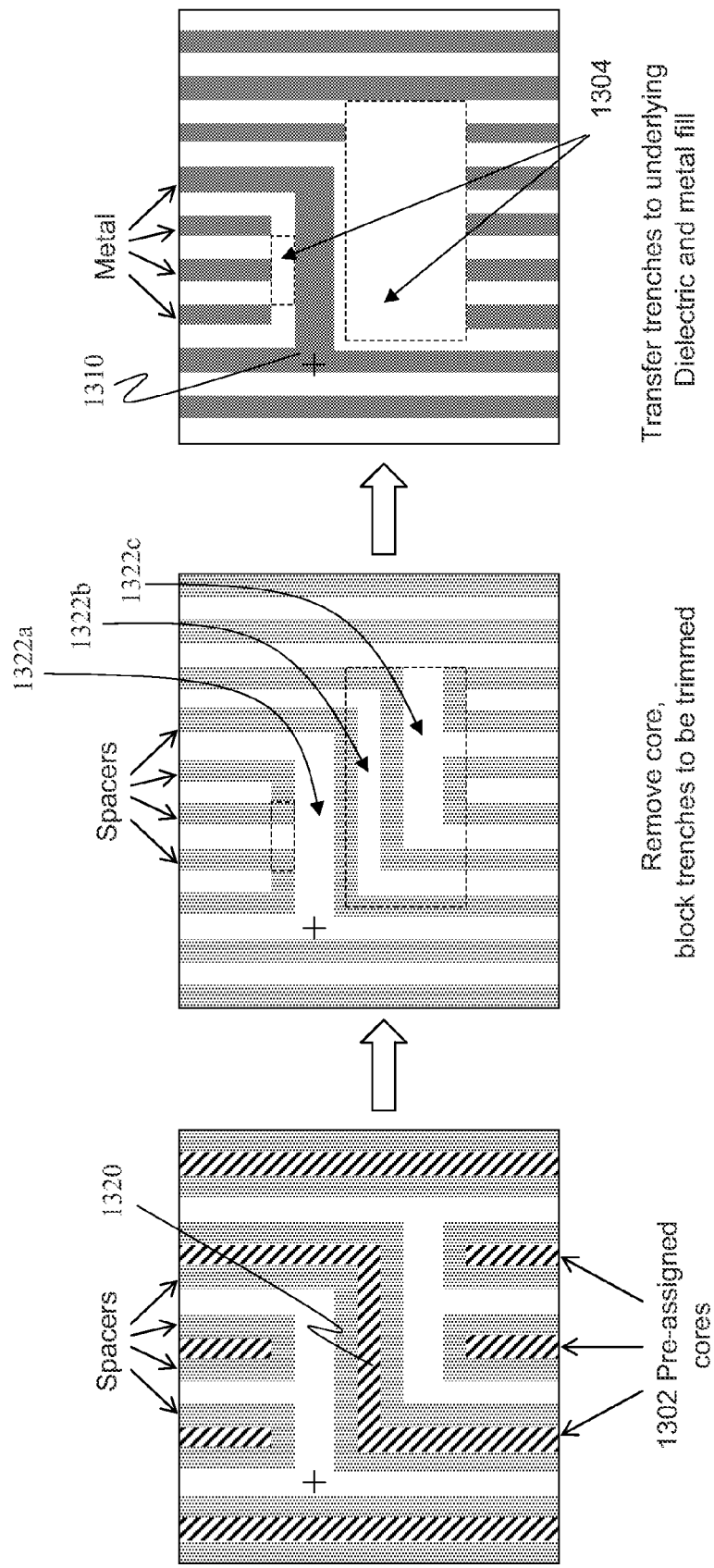
FIG. 13 shows in plan view a wrong-way wire connecting tracks using the wire-by-trench SADP method, according to an embodiment of this invention.

FIG. 13 shows a wrong-way connection between wires that do not overlap with core features (odd tracks). Wrong way core feature 1320 forms three trenches 1322a-c which can potentially become metal features. Unwanted metal connections are blocked from being transferred into the inter-metal dielectric by a feature 1304 of the trim mask. FIG. 13 also shows an example of a T-junction 1310 made by trenches that are not formed by core features 1302. Using wire-by-trench SADP, a wrong-way connection takes up a swath that is approximately eight times as wide as the minimum dimension.

Some of the disclosed figures show tracks that have uniform width and spacing. It is noted that the pre-coloring algorithm of embodiments of the invention can also be employed with non-uniform widths and/or spacings as well. For example, power-routes may be implemented with a wide-wire or wide-spacing that is near or adjacent to other tracks that are minimum width signal routes. Widths of wires and spaces between wires need not be constant in the LELE approach. Widths of spaces between wires need not be constant in the wire-by-spacer SADP method. Widths of wires need not be constant in the wire-by-trench SADP method.

A similar approach can be taken where contiguous areas of one chip may have tracks that are not aligned with other contiguous-areas. As long as a given contiguous area is far enough away (e.g. minimum-spacing needed between the same-color lithography shapes) it can be done independently.

This covers the situation where there are different power-domains (and hence different power/signal track assignments). Inside one power-domain the tracks are all pre-assigned, but a neighboring power-domain may have a different track pattern and pre-assignment. For example, consider two copies of the pattern in FIG. 4, one above the other but with opposite coloring for one of them. As long as the vertical separation between them is large enough, the pre-assigned patterns of both can be done independently, where both regions are colorable.

Wires between the two contiguous-areas should be handled carefully. If the tracks are aligned between the regions, no change is required. However, if there is some misalignment, then one can use "one-color spacing" to jog the wrong-way wire to match up with the track above. This may be implemented by globally assigning the "contiguous regions" based on design knowledge (e.g., block boundaries, power-domain boundaries), but after that point decisions can be made locally to guarantee the design is colorable.

A large chip is often designed hierarchically, where sub-blocks are routed independently of a top-level chip. But lithography sees all the routing shapes at once. A sub-block can be considered as one "contiguous region" and the top-level a different contiguous region. In this context, "top-level" refers to the portion of the layer outside previously routed blocks if the tracks of a block and the tracks of the top-level are aligned, then the methods described previously can be used with no change. A previously routed block has "pins" at its periphery. A pin is a terminal to be connected to a net outside the block. If the tracks of a block and the tracks of the top-level are not aligned, as long as the pins of the block are two tracks apart, they can be routed without color conflicts.

System Architecture Overview

Figure 14:
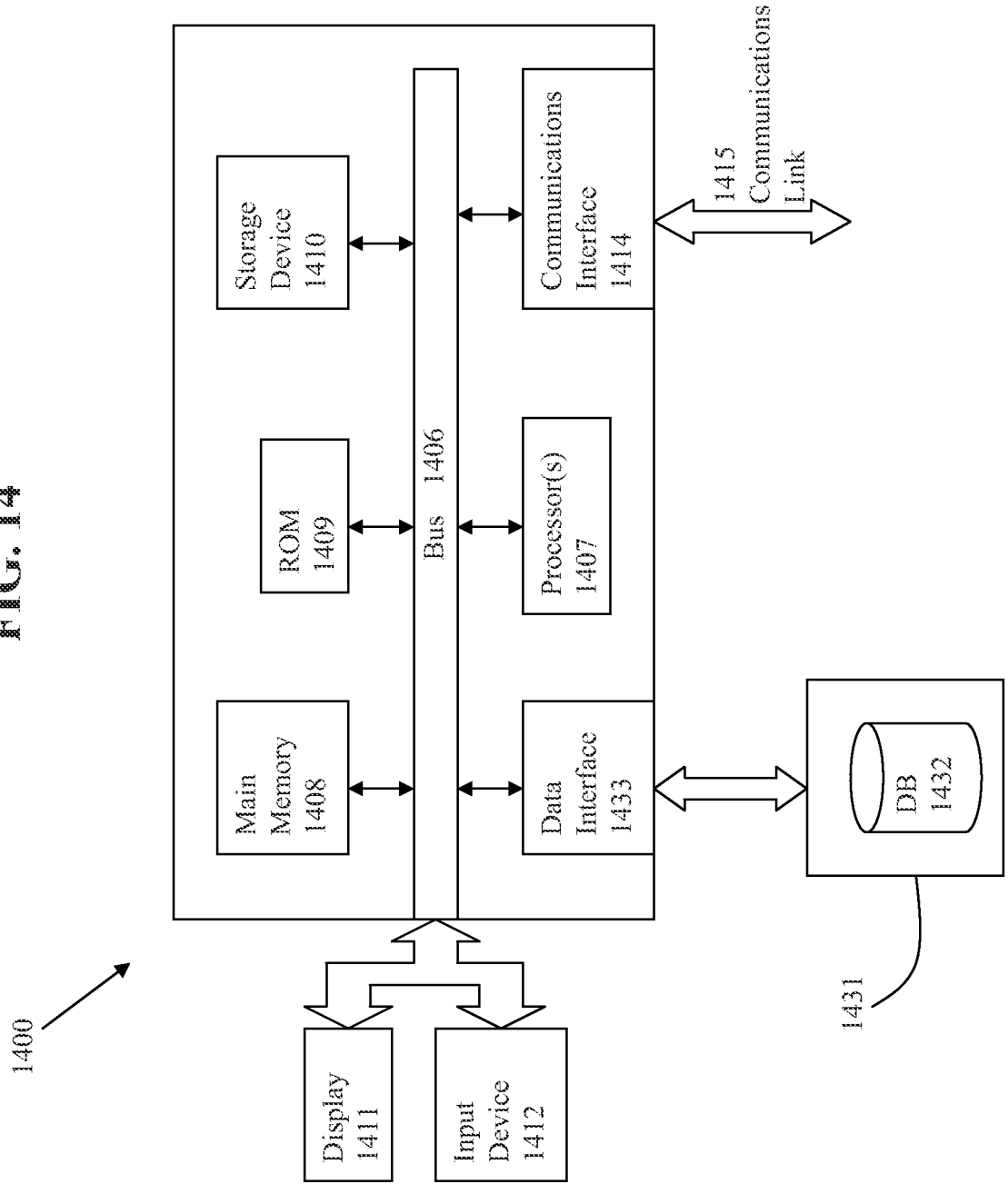
FIG. 14 is a block diagram of a computing system suitable for implementing an embodiment of the present invention.

FIG. 14 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. In an embodiment, the computer system 1400 operates with a component 1431, e.g., a component 1431 that contains a database 1432. The computer system 1400 connects with the component 1431 through a data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What we claim is:

1. A method of routing interconnections of an integrated circuit design, wherein the interconnections in a layer of the integrated circuit design are to be manufactured by using a first photomask and a second photomask, the method of routing comprising:
   using a processor to perform a process, the process comprising:
   determining or identifying an array of routing tracks oriented along a preferred direction, wherein a routing track constitutes a zero-width line on which one or more centerlines of one or more interconnects lie;
   pre-coloring at least two adjacent routing tracks from the array of the routing tracks with respective color designations corresponding to different photomasks; and
   routing interconnects for the integrated circuit design along the at least two adjacent routing tracks such that the interconnects assume the respective color designations of the at least two adjacent routing tracks and are associated with different photomasks according to the respective color designations of the at least two adjacent routing tracks.

2. The method according to claim 1, the process further comprising:
   connecting an interconnect of the interconnects to a landing pad, the landing pad having a long direction oriented perpendicularly to the preferred direction; and
   assigning the landing pad either to be on the first photomask or the second photomask such that the landing pad is more than a predetermined distance away from a neighboring feature on a same photomask, the neighboring feature excluding the interconnect to which the landing pad is connected.

3. The method according to claim 2, the process further comprising using a single-cut via where assigning the landing pad proves impossible.

4. The method according to claim 2, the process further comprising moving at least one of: the landing pad and the neighboring feature elsewhere when assigning the landing pad proves impossible.

5. The method according to claim 1, the process further comprising:
   connecting a first interconnect and a second interconnect, both oriented along the preferred direction, by a third interconnect that is oriented perpendicularly to the preferred direction, where
      when the first interconnect and the second interconnect are on a common photomask, assigning the third interconnect to the common photomask; and
      when the first and second interconnects are on different photomasks, assigning the third interconnect to be on the first photomask or the second photomask such that the third interconnect is more than a predetermined distance away from a neighboring feature on a same photomask, the neighboring feature excluding the first and the second lines; and
   re-routing at least one of the first interconnect, the second interconnect, and the third interconnect when assigning the third interconnect to be on the first photomask impossible.

6. The method according to claim 1, in which the interconnects are routed such that the integrated circuit design is manufacturable with double patterning.

7. The method according to claim 1 in which a wrong-way interconnect is routed, the wrong-way interconnect having an orientation that is not in the preferred direction.

8. The method according to claim 7, the process further comprising:
identifying an exclusion zone around the wrong-way interconnect; and
checking the exclusion zone to identify a manufacturing conflict for double patterning for the wrong-way interconnect.

9. The method according to claim 8 in which the manufacturing conflict is identified if at least two of following objects are identified for the exclusion zone: (a) a group of right-way interconnects on odd numbered tracks; (b) a group of right way interconnects on even numbered tracks; and (c) another wrong-way interconnect.

10. The method according to claim 9, in which the wrong-way interconnect is assigned an opposite number from a wire for one of the following objects (a), (b), or (c).

11. The method according to claim 8 in which the exclusion zone is configured with spacings corresponding to a single lithography step.

12. The method of claim 1 in which wire routing is performed locally without requiring global knowledge of color assignments.

13. The method of claim 1 in which one interconnect is routed at a time, such that the act of routing the interconnects starts from a state having no routing violations, and adds another interconnect that causes no violations, wherein if a violation occurs, a last routed interconnect is removed and rerouted to avoid the violation.

14. A method of routing interconnections of an integrated circuit design, wherein the interconnections in a layer of the integrated circuit design are to be manufactured by a sidewall image transfer method using a core mask having core features and a trim mask having trim features, the method of routing the interconnections comprising:
using a processor to perform a process, the process comprising:
identifying routing tracks oriented along a preferred direction, wherein the routing tracks have spaces in between, and a routing track on which at least a part of an interconnect lies has zero width;
pre-assigning alternating spaces to be formed by the core features, where remaining spaces are not formed by the core features;
designing a trim feature where there exists an edge of a core feature but no interconnection is desired; and
routing wires for the integrated circuit design along at least some of the routing tracks.

15. The method according to claim 14, the process further comprising:
connecting a first wire and a second wire that is an even number of tracks away from the first wire; and
designing a wrong-way feature of the core mask, where the wrong-way feature extends perpendicularly to the preferred direction and connects to a first core feature that is adjacent to the first wire and connects to a second core feature that is adjacent to the second wire.

16. The method according to claim 14 wherein the sidewall image transfer method comprises:
lithographically printing the core features on a wafer;
forming spacers on sidewalls of the core features;
depositing core material and planarizing the wafer;
lithographically printing a resist pattern using the trim mask such that resist is present where no interconnection is desired;
etching spacer material leaving trenches in core material except where the trim features are located;
transferring the trenches into an underlying dielectric layer by a plasma etch process;
lithographically etching holes into the underlying dielectric layer where metal wires are to be connected to an underlying metal layer;
depositing a metal into the trenches and the holes; and
removing excess metal by a chemical mechanical planarization process.

17. A system for routing interconnections of an integrated circuit design, wherein the interconnections in a layer of the integrated circuit design are to be manufactured by using a first photomask and a second photomask, comprising:
a processor that is at least to:
identify or determine an array of routing tracks oriented along a preferred direction, wherein a routing track constitutes a zero-width line on which one or more centerlines of one or more interconnects lie;
pre-color at least two adjacent routing tracks from the array of the routing tracks with respective color designations corresponding to different photomasks; and
route interconnects for the integrated circuit design along the at least two adjacent routing tracks such that the interconnects assume the respective color designations of the at least two adjacent routing tracks and are associated with different photomasks according to the respective color designations of the at least two adjacent routing tracks.

18. The system of claim 17, wherein the processor is further to:
connect an interconnect of the interconnects to a landing pad, the landing pad having a long direction oriented perpendicularly to the preferred direction; and
assign the landing pad either to be on the first photomask or the second photomask such that the landing pad is more than a predetermined distance away from a neighboring feature on same photomask, the neighboring feature excluding the interconnect to which the landing pad is connected.

19. The system of claim 17, wherein the processor is further to:
connect a first interconnect and a second interconnect, both oriented along the preferred direction, by a third interconnect that is oriented perpendicularly to the preferred direction, wherein
when the first interconnect and the second interconnect are on a common photomask, assigning the third interconnect to the common photomask; and
when the first and second interconnects are on different photomasks, assigning the third interconnect to be on the first photomask or the second photomask such that the third interconnect is more than a predetermined distance away from a neighboring feature on a same photomask, neighboring feature excluding the first and the second interconnects; and
re-route at least one of the first interconnect, the second interconnect, and the third interconnect when assigning the third interconnect to be on the first photomask is impossible.

20. The system of claim 17, wherein the at least one processor is further to:
identify an exclusion zone around a wrong-way interconnect, the wrong-way interconnect having an orientation that is not in the preferred direction; and
check the exclusion zone to identify a manufacturing conflict for double patterning for the wrong-way interconnect.

21. A computer program product that includes a non-transitory computer readable storage medium, the non-transitory computer readable storage medium comprising a plurality of computer instructions which, when executed by a processor, cause the processor to execute performing a process for routing interconnections of an integrated circuit design, wherein the interconnections in a layer of the integrated circuit design are to be manufactured by using a first photomask and a second photomask, the process comprising:
- identifying or determining an array of routing tracks oriented along a preferred direction, wherein a routing track constitutes a zero-width line on which one or more centerlines of one or more interconnects lie;
- pre-coloring at least two adjacent routing tracks from the array of the routing tracks with respective color designations corresponding to different photomasks; and
- routing interconnects for the integrated circuit design along the at least two adjacent routing tracks such that the interconnects assume the respective color designations of the at least two adjacent routing tracks and are associated with different photomasks according to the respective color designations of the at least two adjacent routing tracks.

22. The computer program product of claim 21, the process further comprising:
- identifying an exclusion zone around a wrong-way interconnect, the wrong-way interconnect having an orientation that is not in the preferred direction; and
- checking the exclusion zone to identify a manufacturing conflict for double patterning for the wrong-way interconnect.

23. The computer program product of claim 21, the process further comprising:
- connecting an interconnect of the interconnects to a landing pad, the landing pad having a direction oriented perpendicularly to the preferred direction; and
- assigning the landing pad either to be on the first photomask or the second photomask such that the landing pad is more than a predetermined distance away from a neighboring feature on a same photomask, the neighboring feature excluding the interconnect to which the landing pad is connected.

24. The computer program product of claim 21, wherein the process further comprises:
- connecting a first interconnect and a second interconnect, both oriented along the preferred direction, by a third interconnect that is oriented perpendicularly to the preferred direction, wherein
  - when the first interconnect and the second interconnect are on a common photomask, assigning the third interconnect to the common photomask; and
  - when the first and second interconnects are on different photomasks, assigning the third interconnect to be on the first photomask or the second photomask such that the third interconnect is more than a predetermined distance away from a neighboring feature on a same photomask, neighboring feature excluding the first and the second interconnects; and
- re-routing at least one of the first interconnect, the second interconnect, and the third interconnect when assigning the third interconnect to be on the first photomask is impossible.

* * * * *